(12) United States Patent
Gundavelli et al.

(10) Patent No.: US 12,256,216 B2
(45) Date of Patent: *Mar. 18, 2025

(54) TECHNIQUES TO FACILITATE FAST ROAMING BETWEEN A MOBILE NETWORK OPERATOR PUBLIC WIRELESS WIDE AREA ACCESS NETWORK AND AN ENTERPRISE PRIVATE WIRELESS WIDE AREA ACCESS NETWORK

(71) Applicant: Cisco Technology, Inc., San Jose, CA (US)

(72) Inventors: Srinath Gundavelli, San Jose, CA (US); Indermeet Singh Gandhi, San Jose, CA (US); Oliver James Bull, Bristol (GB); Louis Gwyn Samuel, Swindon (GB); Mark Grayson, Berkshire (GB)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/641,988

(22) Filed: Apr. 22, 2024

(65) Prior Publication Data
US 2024/0314559 A1 Sep. 19, 2024

Related U.S. Application Data

(63) Continuation of application No. 18/318,268, filed on May 16, 2023, now Pat. No. 12,047,774, which is a
(Continued)

(51) Int. Cl.
*H04W 12/06* (2021.01)
*H04W 12/0433* (2021.01)
(Continued)

(52) U.S. Cl.
CPC ....... *H04W 12/06* (2013.01); *H04W 12/0433* (2021.01); *H04W 12/08* (2013.01);
(Continued)

(58) Field of Classification Search
CPC . H04W 12/06; H04W 12/08; H04W 12/0433; H04W 12/04
See application file for complete search history.

(56) References Cited

U.S. PATENT DOCUMENTS 7,788,492 B2    8/2010   Cam Winget
7,873,352 B2    1/2011   Nguyen et al.
(Continued)

FOREIGN PATENT DOCUMENTS

CA    2546543 A1    11/2006
EP    1672945 A1    6/2006
(Continued)

OTHER PUBLICATIONS

J. Prados-Garzon, P. Ameigeiras, J. Ordonez-Lucena, P. Muñoz, O. Adamuz-Hinojosa and D. Camps-Mur, "5G Non-Public Networks: Standardization, Architectures and Challenges," in IEEE Access, vol. 9, pp. 153893-153908, 2021. (Year: 2021).*
(Continued)

*Primary Examiner* — Kari L Schmidt
(74) *Attorney, Agent, or Firm* — Edell, Shapiro & Finnan, LLC

(57) ABSTRACT

Presented herein are techniques to facilitate fast roaming between a mobile network operator-public (MNO-public) wireless wide area (WWA) access network and an enterprise private WWA access network. In one example, a method is provided that may include generating, by an authentication node, authentication material for a user equipment (UE) based on the UE being connected to a public WWA access network, wherein the public WWA access network is asso-
(Continued)

ciated with a mobile network operator, and the authentication node and the UE are associated with an enterprise entity; obtaining, by the authentication node, an indication that the UE is attempting to access a private WWA access network associated with the enterprise entity; and providing, by the authentication node, the authentication material for the UE, wherein the authentication material facilitates connection establishment between the UE and the private WWA access network.

20 Claims, 8 Drawing Sheets

Related U.S. Application Data continuation of application No. 16/934,075, filed on Jul. 21, 2020, now Pat. No. 11,706,619.

(60) Provisional application No. 63/002,650, filed on Mar. 31, 2020.

(51) Int. Cl.
*H04W 12/08* (2021.01)
*H04W 36/14* (2009.01)
*H04W 60/04* (2009.01)
*H04W 84/04* (2009.01)

(52) U.S. Cl.
CPC ........... *H04W 36/14* (2013.01); *H04W 60/04* (2013.01); *H04W 36/142* (2023.05); *H04W 84/04* (2013.01)

(56) References Cited

U.S. PATENT DOCUMENTS

| | | | |
|---|---|---|---|
| 8,023,484 | B1 | 9/2011 | Huang et al. |
| 8,036,222 | B1 | 10/2011 | Huang et al. |
| 8,559,392 | B2 | 10/2013 | Ramankutty et al. |
| 8,725,138 | B2 | 5/2014 | Lee et al. |
| 8,959,598 | B2 | 2/2015 | Smith |
| 9,264,900 | B2 | 2/2016 | Sun et al. |
| 9,692,744 | B2 | 6/2017 | Bent et al. |
| 9,699,601 | B2 | 7/2017 | Grayson et al. |
| 9,826,401 | B2 | 11/2017 | Carames et al. |
| 10,015,713 | B2 | 7/2018 | Hedberg et al. |
| 10,039,151 | B1 | 7/2018 | Upp et al. |
| 10,080,097 | B2 | 9/2018 | Grayson et al. |
| 10,165,608 | B2 | 12/2018 | Grayson et al. |
| 10,257,753 | B2 | 4/2019 | Sirotkin et al. |
| 10,432,463 | B2 | 10/2019 | Likar |
| 10,750,350 | B1 | 8/2020 | Gundavelli et al. |
| 10,750,366 | B1 | 8/2020 | Gundavelli et al. |
| 10,785,652 | B1 | 9/2020 | Ravindranath et al. |
| 10,984,128 | B1 | 4/2021 | Hoffer |
| 11,070,974 | B2 | 7/2021 | Dodd-Noble et al. |
| 11,108,773 | B1 | 8/2021 | Dhani Reddy |
| 11,765,581 | B2 * | 9/2023 | Gandhi ................. H04W 12/06 726/26 |
| 2002/0193100 | A1 | 12/2002 | Riffe et al. |
| 2003/0069030 | A1 | 4/2003 | Mukherjee |
| 2004/0242228 | A1 | 12/2004 | Lee et al. |
| 2007/0064647 | A1 | 3/2007 | Prasad |
| 2007/0110009 | A1 | 5/2007 | Bachmann et al. |
| 2007/0206537 | A1 | 9/2007 | Cam-Winget et al. |
| 2010/0002626 | A1 | 1/2010 | Schmidt et al. |
| 2010/0035578 | A1 | 2/2010 | Ahmed |
| 2010/0199332 | A1 | 8/2010 | Bachmann et al. |
| 2011/0075675 | A1* | 3/2011 | Koodli ................. H04M 15/41 370/401 |
| 2013/0176897 | A1 | 7/2013 | Wang et al. |
| 2013/0305332 | A1 | 11/2013 | Narasimhan et al. |
| 2013/0336210 | A1 | 12/2013 | Connor et al. |
| 2014/0050320 | A1 | 2/2014 | Choyi et al. |
| 2014/0328193 | A1 | 11/2014 | Horn et al. |
| 2016/0066234 | A1 | 3/2016 | Cho et al. |
| 2016/0094988 | A1 | 3/2016 | Lee et al. |
| 2016/0112869 | A1 | 4/2016 | Lee et al. |
| 2016/0127897 | A1 | 5/2016 | Lee et al. |
| 2016/0127903 | A1 | 5/2016 | Lee et al. |
| 2016/0373992 | A1 | 12/2016 | Jung et al. |
| 2017/0078874 | A1 | 3/2017 | Lee et al. |
| 2017/0134940 | A1 | 5/2017 | Sharma et al. |
| 2017/0223531 | A1 | 8/2017 | Mestanov et al. |
| 2017/0230826 | A1 | 8/2017 | Mestanov et al. |
| 2017/0332273 | A1 | 11/2017 | Link, II |
| 2018/0020383 | A1 | 1/2018 | Sirotkin et al. |
| 2018/0041930 | A1 | 2/2018 | Hampel et al. |
| 2018/0145982 | A1 | 5/2018 | Wang et al. |
| 2018/0184297 | A1 | 6/2018 | Mohamed et al. |
| 2018/0184345 | A1 | 6/2018 | Likar et al. |
| 2018/0206117 | A1 | 7/2018 | Stahl |
| 2018/0262978 | A1 | 9/2018 | Kahn et al. |
| 2018/0332442 | A1 | 11/2018 | Shaw et al. |
| 2018/0352490 | A1 | 12/2018 | Hu et al. |
| 2019/0007376 | A1 | 1/2019 | Norrman et al. |
| 2019/0037390 | A1 | 1/2019 | Hooda et al. |
| 2019/0037613 | A1 | 1/2019 | Anantharaman et al. |
| 2019/0053049 | A1 | 2/2019 | Kunz et al. |
| 2019/0230510 | A1 | 7/2019 | Ben Henda et al. |
| 2019/0253407 | A1 | 8/2019 | Livanos et al. |
| 2019/0268759 | A1 | 8/2019 | Targali |
| 2019/0313318 | A1 | 10/2019 | Pawar et al. |
| 2020/0153871 | A1 | 5/2020 | Lei et al. |
| 2020/0162889 | A1 | 5/2020 | Desai et al. |
| 2020/0204984 | A1 | 6/2020 | Dodd-Noble et al. |
| 2021/0084493 | A1 | 3/2021 | Naribole et al. |
| 2021/0105632 | A1 | 4/2021 | Pazhyannur et al. |
| 2021/0185506 | A1 | 6/2021 | Gundavelli et al. |
| 2021/0195399 | A1 | 6/2021 | Li et al. |
| 2021/0218744 | A1 | 7/2021 | Gandhi et al. |
| 2021/0281445 | A1 | 9/2021 | Trim et al. |
| 2021/0385742 | A1 | 12/2021 | Liao |
| 2022/0124850 | A1 | 4/2022 | Gundavelli et al. |
| 2022/0330008 | A1 | 10/2022 | Balasubramanian |
| 2023/0066659 | A1 | 3/2023 | Balasubramanian et al. |
| 2023/0106524 | A1 | 4/2023 | Balasubramanian |
| 2023/0164683 | A1 | 5/2023 | Wong et al. |
| 2023/0300595 | A1 | 9/2023 | Dudar et al. |
| 2024/0214965 | A1* | 6/2024 | Wang .................... H04W 60/06 |
| 2024/0244429 | A1* | 7/2024 | Nie ........................ H04W 12/69 |

FOREIGN PATENT DOCUMENTS

| | | |
|---|---|---|
| EP | 3494727 B1 | 5/2020 |
| WO | 2009008627 A2 | 1/2009 |
| WO | 2018026551 A1 | 2/2018 |
| WO | 2018052409 A1 | 3/2018 |

OTHER PUBLICATIONS

D. Lake and C. Balakrishna, "Using Value Added Services to Realise the Benefits of Enterprise Small Cell Deployments: Discussion and Prototype," 2015 9th International Conference on Next Generation Mobile Applications, Services and Technologies, Cambridge, UK, 2015, pp. 399-404. (Year: 2015).*

M. Wen et al., "Private 5G Networks: Concepts, Architectures, and Research Landscape," in IEEE Journal of Selected Topics in Signal Processing, vol. 16, No. 1, pp. 7-25, Jan. 2022 (Year: 2021).*

3GPP: "3rd Generation Partnership Project; Technical Specification Group Core Network and Terminals; 5G System; Session Management Services; Stage 3 (Release 16)," 3GPP TS 29.502 V16.4.0, Jul. 2020, pp. 1-256.

3GPP: "3rd Generation Partnership Project, Technical Specification Group Core Network and Terminals, Access Network Discovery and Selection Function (ANDSF) Management Object (MO) (Release 16)", 3GPP TS 24.312, V16.0.0, Jul. 2020, pp. 1-394.

3GPP: "3rd Generation Partnership Project; Technical Specification Group Core Network and Terminals; Non-Access-Stratum (NAS)

(56) References Cited

OTHER PUBLICATIONS protocol for Evolved Packet System (EPS); Stage 3 (Release 16)," 3GPP TS 24.301 V16.1.1, Jun. 2019, 549 Pages.
3GPP, "3rd Generation Partnership Project; Technical Specification Group Radio Access Network; Evolved Universal Terrestrial Radio Access (E-UTRA); User Equipment (UE) procedures in idle mode (Release 16)," TS 36.304, V16.1.0, Jul. 2020, pp. 1-63 pages.
3GPP: "3rd Generation Partnership Project; Technical Specification Group Services and System Aspects; Procedures for the 5G System (5GS); Stage 2 (Release 16)," 3GPP TS 23.502 V16.5.0, Jul. 2020, pp. 1-594.
3GPP: "3rd Generation Partnership Project; Technical Specification Group Services and System Aspects; Security architecture and procedures for 5G system (Release 16)," 3GPP Standard, Technical Specificaton, 3GPP TS 33.501, 3rd Generation Partnership Project (3GPP), Mobile Competence Centre, 650, Route Des Lucioles, F-06921 Sophia-Antipolis Cedex, France, Mar. 27, 2020, vol. SA WG3, No. V16.2.0, 227 pages, XP051861202, Retrieved from URL: http://ftp.3gpp.org/Specs/archive/33_series/33.501/33501-g20.zip.
3GPP: "3rd Generation Partnership Project; Technical Specification Group Services and System Aspects; Security Architecture and Procedures for 5G System (Release 16)," 3GPP TS 33.501 V16.4.0, Sep. 2020, pp. 1-250.
Aboba B., et al., "Extensible Authentication Protocol (EAP) Key Management Framework," Network Working Group, Request for Comments: 5247, Updates: 3748, Category: Standards Track, Aug. 2008, pp. 1-79.
Aboba B., et al., "Extensible Authentication Protocol (EAP)," Network Working Group, Request for Comments: 3748, Obsoletes: 2284, Category: Standards Track, Jun. 2004, pp. 1-67.
Aijaz A., "Private 5G: The Future of Industrial Wireless," IEEE Industrial Electronics Magazine, vol. 14, No. 4, Dec. 22, 2020, pp. 136-145.
Arkko J., et al., "Extensible Authentication Protocol Method for 3rd Generation Authentication and Key Agreement (EAP-AKA)," Network Working Group, Request for Comments: 4187, Category: Informational, Jan. 2006, pp. 1-79.
Arkko J., et al., "Improved Extensible Authentication Protocol Method for 3rd Generation Authentication and Key Agreement (EAP-AKA)," Network Working Group, Request for Comments: 5448, Updates: 4187, Category: Informational, May 2009, 29 Pages.
Cablelabs: "A Comparative Introduction to 4G and 5G Authentication," Feb. 2019, 19 Pages, Retrieved from URL: https://www.cablelabs.com/insights/a-comparative-introduction-to-4g-and-5g-authentication.
Cisco: "802.11r Fast Transition Roaming," 802.11r, 802.11k and 802.11w Deployment Guide, Cisco IOS-XE Release 3.3, Jul. 2015, 08 pages.
Elsadek W. F., et al., "Inter-domain Mobility Management Using SDN for Residential/enterprise Real Time Services", 2016 IEEE 4th International Conference on Future Internet of Things and Cloud Workshops FiCioudW, Vienna, Austria, Aug. 2016, pp. 43-50.
Eronen P., et al., "Diameter Extensible Authentication Protocol (EAP) Application," Network Working Group, Request for Comments: 4072, Category: Standards Track, Aug. 2005, pp. 1-33.

ETSI: "5G; Security Architecture and Procedures for 5G System (3GPP TS 33.501 Version 15.1.0 Release 15)," ETSI TS 133 501 V15.1.0, Jul. 2018, 150 Pages.
ETSI: "Digital Cellular Telecommunications System (Phase 2+) (GSM); Universal Mobile Telecommunications System (UMTS); LTE; 3GPP System Architecture Evolution (SAE); Security Aspects ofNon-3GPP Accesses (3GPP TS 33.402 /Version 14.2.0 Release 14)," ETSI TS 133 402 V14.2.0, Jul. 2017, 72 Pages.
ETSI, LTE: "Evolved Universal Terrestrial Radio Access (E-UTRA); Radio Resource Control (RRC); Protocol specification (3GPP TS 36.331 version 15.3.0 Release 15)," ETSI TS 136 331 V15.3.0, Oct. 2018, pp. 604-607.
ETSI TS 124 302, "Universal Mobile Telecommunications System (UMTS); LTE; Access to the3GPP Evolved Packet Core (EPC) via Non-3GPP Access Networks; Stage3 (3GPP TS 24.302 version15.3.0 Release15)," ETSI TS 124 302 V15. 3.0, Jun. 2018, 171 pages.
ETSI TS 136 331, "LTE, Evolved Universal Terrestrial Radio Access (E-UTRA), Radio Resource Control(RRC), Protocol Specification (3GPPTS36.331version15.3.0Release15)," ETSI TS 136 331 v15.3.0, Oct. 2018, pp. 230-239.
Funk P., et al., "Extensible Authentication Protocol Tunneled Transport Layer Security Authenticated Protocol Version 0 (EAP-TTLSv0)," Network Working Group, Request for Comments: 5281, Category: Informational, Aug. 2008, pp. 1-51.
Garzon J.P., et al., "5G Non-Public Networks: Standardization, Architectures and Challenges", in IEEE Access, vol. 9, Nov. 10, 2021, pp. 153893-153908.
Gures E., et al., "A Comprehensive Survey on Mobility Management in 5G Heterogeneous Networks: Architectures, Challenges and Solutions," IEEE Access, Nov. 9, 2020, vol. 8, pp. 195883-195913.
"IEEE Standard for Information technology—Telecommunications and information exchange between systems—Local and metropolitan area networks—Specific requirements," Part 11: Wireless LAN Medium Access Control (MAC) and Physical Layer (PHY) Specifications Amendment 2: Fast Basic Service Set (BSS), computer Society, Sponsored by the LAN/MAN Standards Committee, IEEE std 802.11rTM-2008, Jul. 15, 2008, 126 Pages.
International Search Report and Written Opinion in counterpart International Application No. PCT/US2021/024110, mailed Jun. 1, 2021, 15 Pages.
Johnson M., et al., "dLTE: Building a more WiFi-like cellular network: (instead of the other way around)", Proceedings of the 17th ACM Workshop on Hot Topics in Networks, Nov. 15, 2018, pp. 8-14.
Kaufman C., et al., "Internet Key Exchange Protocol Version 2 (IKEv2)", Internet Engineering Task Force (IETF), Request for Comments: 7296, Standards Track, Oct. 2014, pp. 1-142.
Simon D., et al., "The EAP-TLS Authentication Protocol," Network Working Group, Request for Comments: 5216, Obsoletes: 2716, Category: Standards Track, Mar. 2008, pp. 1-34.
Tabassam A. A., et al., "Fast and Seamless Handover for Secure Mobile Industrial Applications with 802.11 r", 2009 IEEE 34th Conference on Local Computer Networks, Zurich, Switzerland, Oct. 20-23, 2009, pp. 750-757.

* cited by examiner

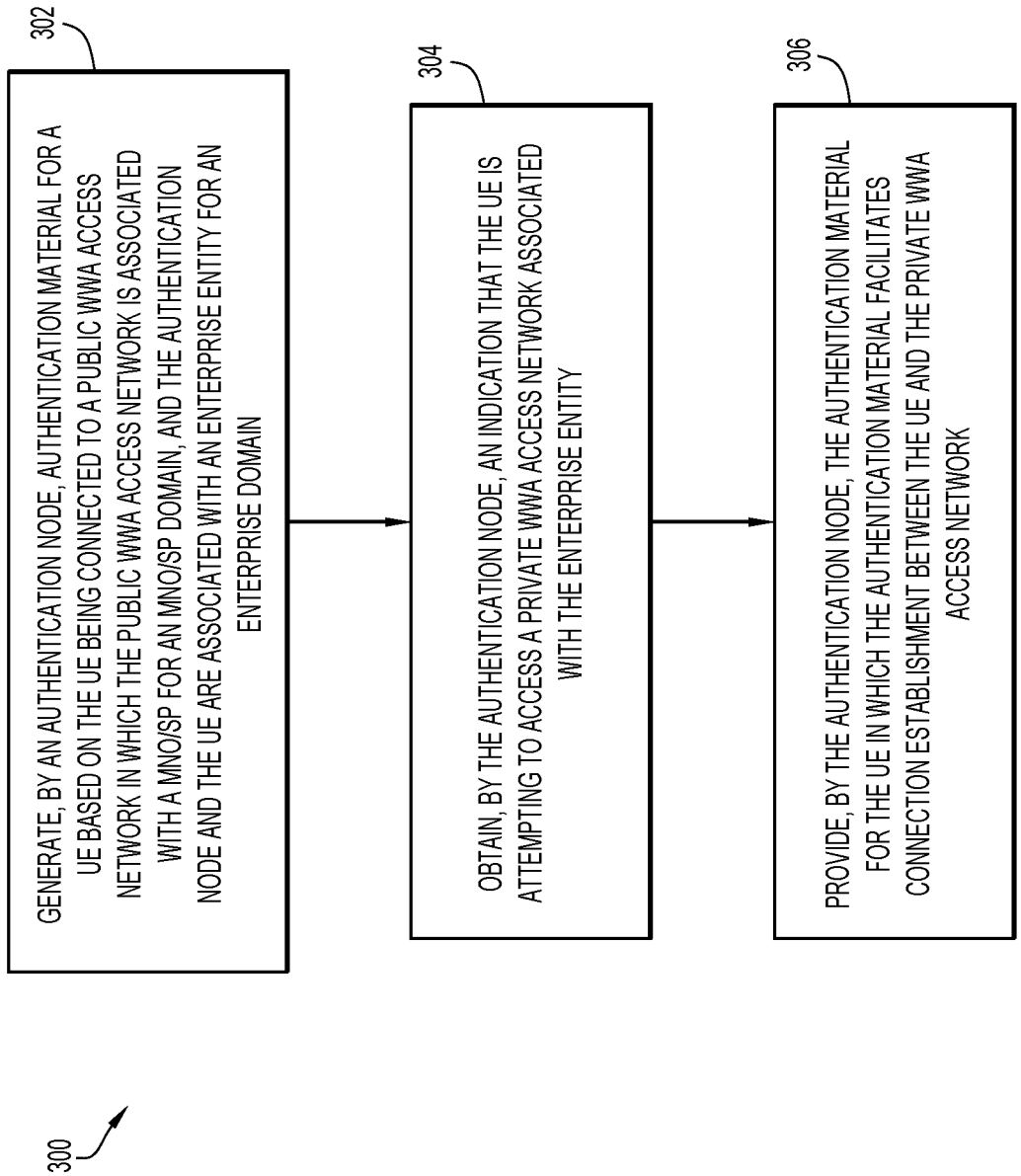

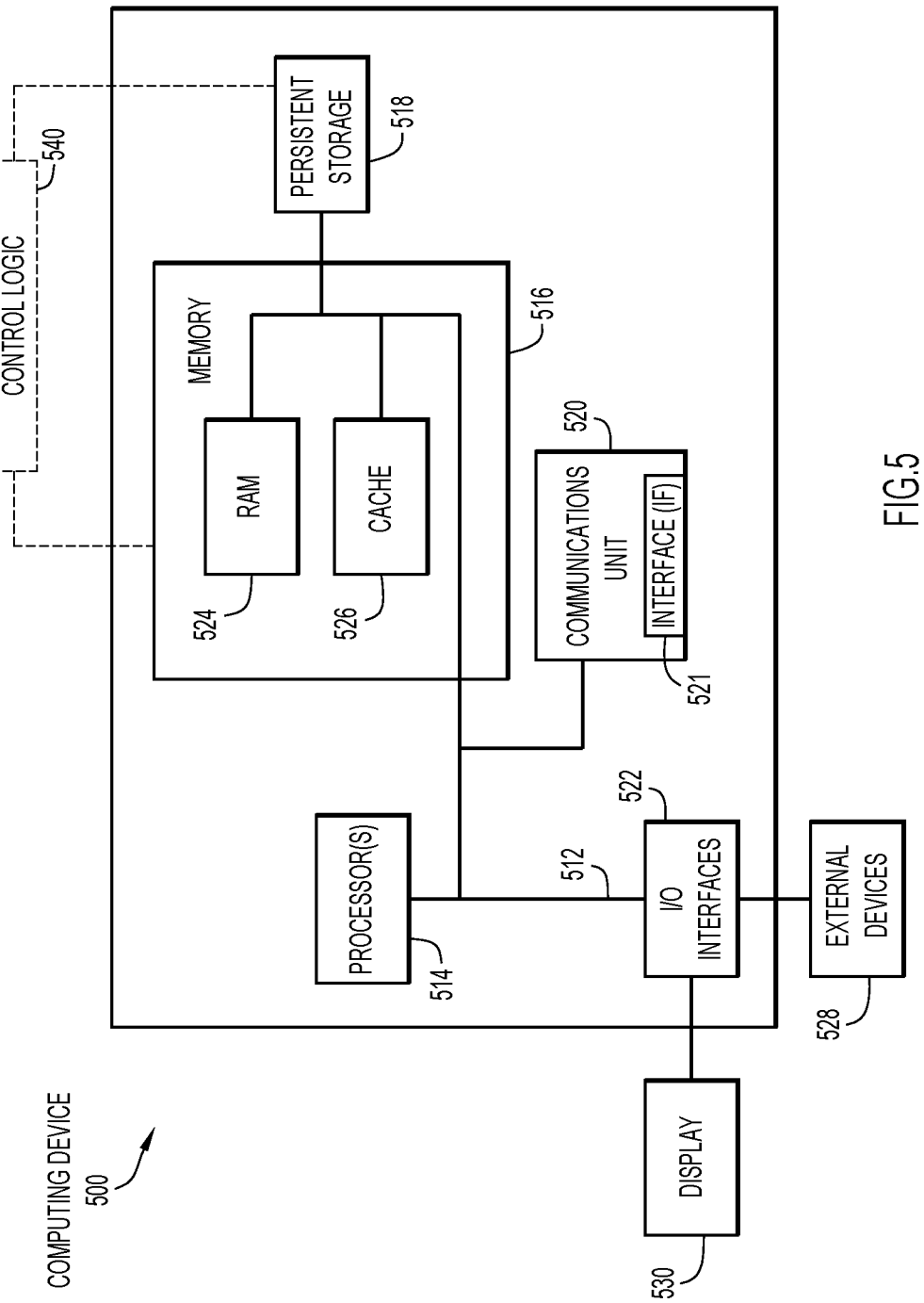

TECHNIQUES TO FACILITATE FAST ROAMING BETWEEN A MOBILE NETWORK OPERATOR PUBLIC WIRELESS WIDE AREA ACCESS NETWORK AND AN ENTERPRISE PRIVATE WIRELESS WIDE AREA ACCESS NETWORK

PRIORITY CLAIM

This application is a continuation of and claims the benefit of priority to U.S. patent application Ser. No. 18/318,268, filed May 16, 2023, which application is a continuation of and claims the benefit of priority to U.S. patent application Ser. No. 16/934,075, filed Jul. 21, 2020, and issued on Jul. 18, 2023, as U.S. Pat. No. 11,706,619, which application claims the benefit of priority under 35 U.S.C. § 119 to U.S. Provisional Application No. 63/002,650, filed Mar. 31, 2020, the entirety of which applications are incorporated herein by reference.

TECHNICAL FIELD

The present disclosure relates to network equipment and services.

BACKGROUND

Networking architectures have grown increasingly complex in communications environments, particularly mobile networking environments. Mobile communication networks have grown substantially as end users become increasingly connected to mobile network environments. As the number of mobile users increases and as access network resources are shared among multiple service providers, efficient management of communication resources becomes more critical. In particular, there are significant challenges in facilitating roaming between different networks.

BRIEF DESCRIPTION OF THE DRAWINGS

FIG. 3 is a flow chart depicting a method according to an example embodiment.

FIG. 5 is a hardware block diagram of a computing device that may perform functions associated with any combination of operations, in connection with the techniques depicted in FIGS. 1-4.

DESCRIPTION OF EXAMPLE EMBODIMENTS

Overview

Figure 1:
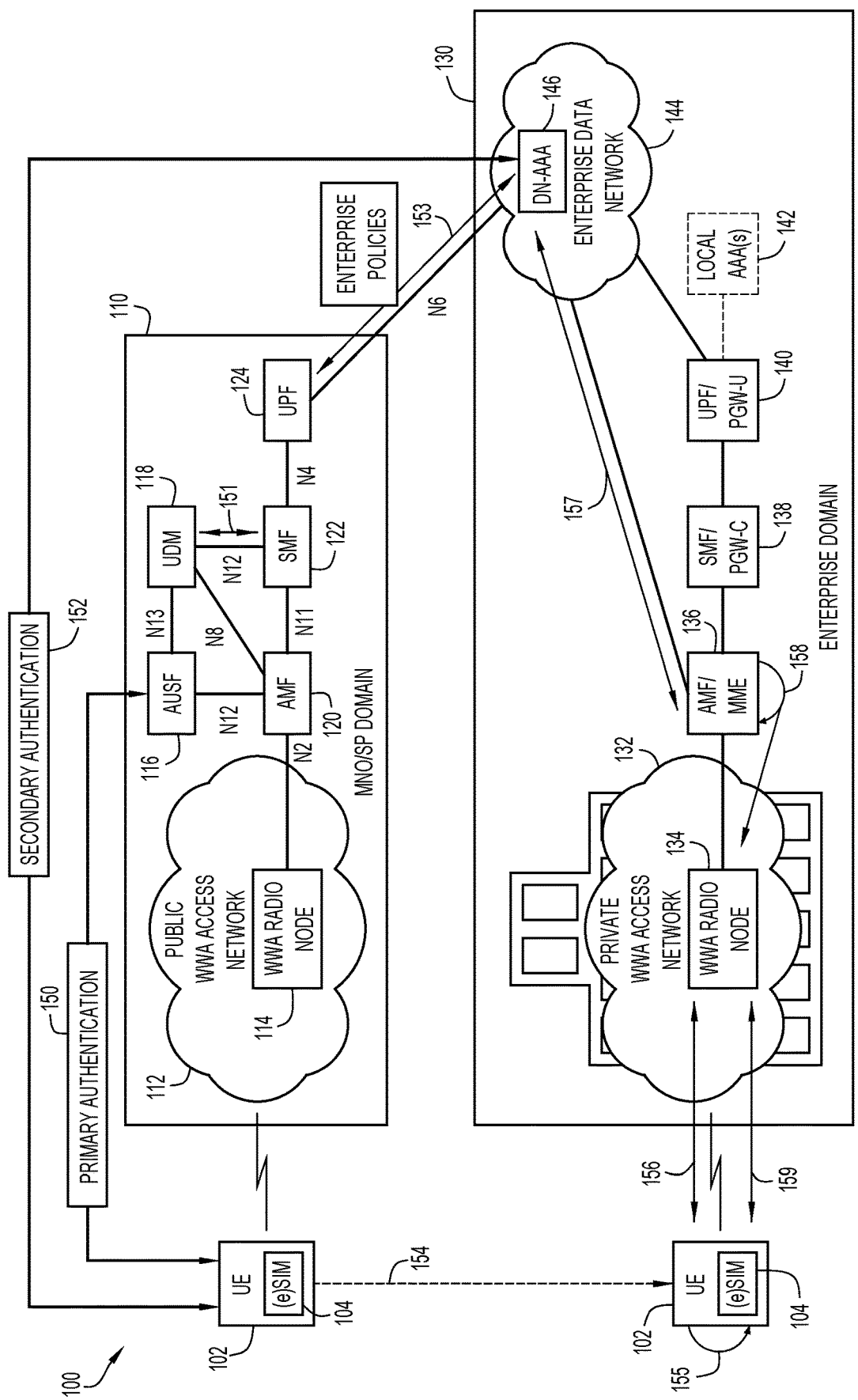
FIG. 1 is a diagram of a system in which techniques may be implemented to facilitate fast roaming between a mobile network operator and/or service provider (MNO/SP) public wireless wide area (WWA) access network and an enterprise private WWA access network, according to an example embodiment.

Techniques presented herein may provide for extending Third (3rd) Generation Partnership Project (3GPP) secondary authentication to facilitate fast roaming between a public mobile network operator and/or service provider (MNO/SP-public) wireless wide area (WWA) access network, such as a 3GPP Fifth (5th) Generation (5G) WWA access network and an enterprise private WWA access network, such as any combination of a Fourth (4th) Generation (4G), 5G, and/or next Generation (nG) WWA access network.

In one embodiment, a method is provided that may include generating, by an authentication node, authentication material for a user equipment (UE) based on the UE being connected to a public WWA access network, wherein the public WWA access network is associated with a mobile network operator, and the authentication node and the UE are associated with an enterprise entity; obtaining, by the authentication node, an indication that the UE is attempting to access a private WWA access network associated with the enterprise entity; and providing, by the authentication node, the authentication material for the UE, wherein the authentication material facilitates connection establishment between the UE and the private WWA access network.

In one embodiment, another method is provided that may include performing, by a UE following a primary authentication process with a mobile network operator domain, a secondary authentication process with an authentication node of an enterprise domain in which the secondary authentication process is performed via a public WWA access network of the mobile network operator domain and the secondary authentication process. In at least one embodiment, the secondary authentication process may include obtaining, by the UE, an identifier for a private WWA access network of the enterprise domain, an identifier for the authentication node, and an identifier for the UE. The method may further include obtaining, by the UE, a broadcast from the private WWA access network of the enterprise domain in which the broadcast indicates support for fast roaming into the private WWA access network. In at least one embodiment, obtaining the broadcast by the UE may trigger the UE to generate ciphering and integrity keys based on the identifier for the private WWA access network. The method may further include communicating, by the UE, a registration request to the enterprise domain via the private WWA access network. In at least one embodiment, the registration request may include, at least in part: an indication that ciphering and integrity keys have already been generated by the UE, the identifier for the authentication node (obtained via the secondary authentication process), and the identifier for the UE (obtained via the secondary authentication process). The method may further include the UE establishing a connection with the enterprise domain via the private WWA access network for one or more data communications with a data network of the enterprise domain.

EXAMPLE EMBODIMENTS

As referred to herein, an 'enterprise' or 'enterprise entity' may be considered to be a business, government, educational institution, an organization, and/or the like that may include multiple enterprise locations (or sites), such as a main campus, remote branches, and so on. Enterprise devices (e.g., enterprise user equipment (UE), etc.) that may be owned, operated, and/or otherwise associated with an enterprise may be utilized by enterprise users to serve enterprise purposes (e.g., business purpose, government purpose, educational/university purpose, etc.) of the enterprise. In some instances, an enterprise may operate an enterprise network, also referred to as an enterprise data network, which may be a network implemented to serve enterprise purposes (e.g., host enterprise applications/services/etc., perform authentications/authorizations, etc. for enterprise users associated with one or more UE).

As referred to herein, a wireless wide area (WWA) access network, such as a cellular/3GPP access networks, may be characterized as a Radio Access Network (RAN) having radio nodes (e.g., evolved Node Bs (eNBs or eNodeBs), next generation Node Bs (gNBs or gNodeBs, etc.) that provide a larger RAN coverage area as compared to the RAN coverages area typically provided by wireless local area (WLA) radio nodes (e.g., Institute of Electrical and Electronics Engineers (IEEE) 802.11 access points, Wi-Fi® access points, etc.). Stated differently, the WWA RAN coverage area provided by a WWA radio node is typically larger (sometimes orders of magnitude larger) than the WLA RAN coverage area provided by a WLA radio node. Additionally, a WWA RAN radio node can typically provide radio access connectivity for a larger number of devices as compared to a WLA RAN radio nodes. Depending on implementation, any combination of WWA and/or WLA RANs may be utilized to facilitate connections between one or more devices and any combination of Local Area Networks (LANs), such as an enterprise network for an enterprise location; Wide Area Networks (WANs), such as the Internet, multiple enterprise networks spread across multiple locations; Software Defined WAN (SD-WAN); and/or any other network architecture/environment.

The 3GPP 5G System architecture (sometimes referred to as 5GS) has specified support for secondary authentication operations/processes for authenticating a user equipment (UE) with a data network (DN) that is external or outside a mobile network operator/service provider (MNO/SP) domain. For the secondary authentication process between the UE and a data network Authentication, Authorization, and Accounting (DN-AAA) node and/or service in a data network (DN) external to the MNO/SP domain (such as an enterprise data network for an enterprise domain) different Extensible Authentication Protocol (EAP) based authentication methods and associated credentials can be used to authenticate the UE.

The EAP framework, as specified in Internet Engineering Task Force (IETF) Request For Comments (RFC) 3748 is considered a basis for the secondary authentication process, with a 3GPP Session Management Function (SMF) performing operations of an EAP Authenticator, a UE as performing operations as an EAP Supplicant, and a DN-AAA performing operations as an Authentication Server. When the secondary authentication mode is enabled for an enterprise network and/or enterprise network slice, the 5G core network may rely on the external DN-AAA server to authenticate and authorize a UE's request for establishment of one or more Protocol Data Unit (PDU) session(s) via secondary authentication operations/processes when the UE connects to a public WWA access network of the MNO/SP.

A large part of mobile network operator business may originate from voice and data services offered to enterprise users/UE. Additionally, operators may create customized network slices for different enterprise entities (Ex: enterprise 'A' slice, enterprise 'B' slice, etc.). Access to many of SP enterprise services hosted by a mobile network operator can be enabled through these network slices and may rely on secondary authentication for service authentication and authorization for enterprise users/UEs connected to the MNO/SP network via a 3GPP public WWA access network (e.g., a 3GPP public 5G access network). In this mode, an enterprise network may be the data network for the 3GPP public WWA access network to which the UE connects. When such a relationship between an enterprise and an MNO/SP is established/in place and when secondary authentication is enabled for a UE/PDU session, there is an opportunity to leverage secondary authentication for other purposes.

One such purpose may be to reduce handover latency for a UE that has already completed secondary authentication on an MNO/SP network and then later roams into an enterprise private WWA access network operated by an enterprise entity (e.g., any combination of a private 4G/Long Term Evolution (4G/LTE), 5G, nG, and/or Citizen Broadband Radio Service (CBRS) access network operated by the enterprise entity). Such subsequent authentication to the enterprise private WWA access network following secondary authentication performed via the MNO/SP domain can be characterized as a 'fast roaming' event for the UE transitioning into the enterprise private wireless wide a, as opposed to an initial authentication that would otherwise involve a complete authentication message exchange and key generation between the UE and the enterprise domain.

By 'private' it is meant that a private WWA access network (e.g., a Citizen Broadband Radio Service (CBRS) access network and/or a cellular (4G/LTE, 5G, nG, etc.) access network) may provide network connectivity/services to clients (e.g., users/user equipment/devices/etc.) served by a network operator and/or service provider of the private WWA access network, such as an enterprise. In one example, a private WWA access network may be considered to be a network that may be implemented to serve enterprise purposes (e.g., business purposes, government purposes, educational purposes, etc.) for enterprise clients (e.g., enterprise users/user equipment/devices/etc.) in which the private WWA access network may be operated by any combination of traditional public mobile network operators/service providers (e.g., AT&T®, etc.), enterprises network operators/service providers (e.g., Cisco®, etc.), and/or third party network operators/service providers (e.g., neutral host network operators/service providers, cloud service providers, etc.). A private network may also be referred to as a non-public network (NPN) in some instances. Cisco is a registered trademark of Cisco Technology, Inc. AT&T is a registered trademark of AT&T Intellectual Property.

Techniques presented herein may provide for the ability to facilitate fast roaming between an MNO public WWA access network (e.g., a 5G access network) and an enterprise private WWA (e.g., 4G/5G/nG/CBRS access network) by leveraging the 3GPP secondary authentication mode. In at least one embodiment, a DN-AAA node/service within an enterprise domain may be the common anchor point for secondary authentication of an enterprise user/UE through an MNO/SP public WWA access network and also for authentication of the enterprise user/UE for an enterprise private WWA access network, and can be made to deliver the same key material to the UE in an optimized manner, thereby greatly reducing the time to complete private WWA access network authentication.

For example, for handover of the UE from the MNO/SP public WWA access network to the enterprise private WWA access network, the DN-AAA may be enhanced to provide authentication material (e.g., security key(s), etc.) generated through a previously performed secondary authentication process for the UE in an optimized manner such that the time to complete authentication for the UE into the private WWA access network may be greatly reduced in comparison to the complete authentication message exchange and key generation operations that would otherwise be performed for UE authentication in the absence of the techniques presented herein.

Referring to FIG. 1, FIG. 1 is a block diagram of a system 100 in which techniques may be implemented to facilitate fast roaming between a mobile network operator and/or service provider (MNO/SP) public WWA access network and an enterprise private WWA access network, according to an example embodiment.

In at least one embodiment, system 100 may include a user equipment (UE) 102, an MNO/SP domain 110, and an enterprise domain 130. The MNO/SP domain 110 may be associated with (e.g., operated/managed by) one or more MNO and/or SP entities and may include a public WWA access network 112, an Authentication Server Function (AUSF) 116, a Unified Data Management (UDM) entity (referred to herein as UDM 118), an Access and Mobility Management Function (AMF) 120, a Session Management Function (SMF) 122, and a User Plane Function (UPF) 124. The public WWA access network 112 may include at least one WWA radio node 114, which may also be referred to herein as public WWA radio node 114. UE 102 may also be referred to herein as enterprise UE 102 (e.g., being associated with/operated by an enterprise user associated with enterprise domain 130).

The enterprise domain 130 may be associated with (e.g., operated/managed by) an enterprise entity and may include a private WWA access network 132, any combination of any AMF and/or Mobility Management Entity (MME) 136, any combination of an SMF and/or control plane Packet Data Network (PDN) Gateway (PGW-C) 138, any combination of a UPF and/or user plane PDN Gateway (PGW-U) 140, and an enterprise data network (DN) 144. Private WWA access network 132 may include at least one WWA radio node 134 and enterprise DN 144 may include a DN-AAA node/service 146 (referred to herein as DN-AAA 146). In at least one embodiment, enterprise domain may further include one or more local Authentication, Authorization, and Accounting node(s)/service(s) (AAA(s)) 142. WWA radio node 134 may also be referred to herein as private WWA radio node 134.

For the MNO/SP domain 110, WWA radio node 114 of public WWA access network 112 may interface with AMF 120, which may further interface with AUSF 116, UDM 118, and SMF 122. The AUSF 116 may further interface with UDM 118. The UDM 118 may further interface with SMF 122, which may further interface with UPF 124. The UPF 124 may further interface with enterprise data network 144/DN-AAA 146 of enterprise domain 130. The interface interconnecting UPF 124 of MNO/SP domain 110 and enterprise data network 144/DN-AAA 146 of enterprise domain 130 is a 3GPP N6 interface. The interface interconnecting the SMF 122 and the UPF 124 is a 3GPP N4 interface. The interface interconnecting SMF 122 and AMF 120 is a 3GPP N11 interface. The interface interconnecting SMF 122 and UDM 118 is a 3GPP N12 interface. The interface interconnecting AMF 120 and public WWA radio node 114. The interface interconnecting AMF 120 and AUSF 116 is a 3GPP N12 interface and the interface interconnecting AMF 120 and UDM 118 is a 3GPP N8 interface. The interface interconnecting AUSF 116 and UDM 118 is a 3GPP N13 interface.

For the enterprise domain 130, WWA radio node 134 of private WWA access network 132 may interface with AMF/MME 136, which may further interface with SMF/PGW-C 138 and enterprise data network 144/DN-AAA 146. The SMF/PGW-C 138 may further interface with UPF/PGW-U 140, which may further interface with enterprise data network 144/DN-AAA 146 and, if implemented, one or more local AAA(s) 142. Interfaces are not labeled for enterprise domain 130, however, it is to be understood that enterprise domain 130 elements may interface using any appropriate standards-based and/or enterprise-defined interfaces.

In at least one implementation, MNO/SP domain 110 may be configured to provide 3GPP public 5G/nG and/or CBRS mobile network services via public WWA access network 112/WWA radio node 114. WWA radio node 114 may be implemented as any combination of a 5G and/or nG radio device such as a gNB/gNodeB, and/or a CBRS radio device (CBSDs) and may include any combination of hardware (e.g., communications units, receiver(s), transmitter(s), antenna(s) and/or antenna array(s), processor(s), memory element(s), baseband processor(s) (modems), etc.)], controllers, software, logic, and/or the like to facilitate over-the-air RF WWA access network connections (e.g., 5G/nG, CBRS, etc. connections) with one or more UE, such as UE 102.

In at least one implementation enterprise domain 130 may be configured to provide any combination of 3GPP private 4G/LTE, 5G/nG, and/or CBRS mobile network services via private WWA access network 132/WWA radio node 134. WWA radio node 134 may be any combination of a 4G/LTE radio device such as an eNB/eNodeB, a 5G and/or nG radio device such as a gNB/gNodeB, and/or a CBSD and may include any combination of hardware (e.g., communications units, receiver(s), transmitter(s), antenna(s) and/or antenna array(s), processor(s), memory element(s), baseband processor(s) (modems), etc.)], controllers, software, logic, and/or the like to facilitate over-the-air RF WWA access network connections (e.g., 4G/LTE, 5G/nG, CBRS, etc. connections) with one or more UE, such as UE 102.

UE 102 may be associated with any electronic device, machine, robot, etc. wishing to initiate a flow in systems discussed herein. The terms 'device', 'electronic device', 'UE', 'automation device', 'computing device', 'machine', 'robot', and variations thereof are inclusive of devices used to initiate a communication, such as a computer, a vehicle and/or any other transportation related device having electronic devices configured thereon, an automation device, an enterprise device, an appliance, an Internet of Things (IoT) device, etc., a personal digital assistant (PDA), a laptop or electronic notebook, a cellular telephone, a smart phone, an Internet Protocol (IP) phone, any other device and/or combination of devices, component, element, and/or object capable of initiating voice, audio, video, media, or data exchanges within system 100. UE 102 discussed herein may also be inclusive of a suitable interface to a human user such as a microphone, a display, a keyboard, or other terminal equipment. UE 102 discussed herein may also be any device that seeks to initiate a communication on behalf of another entity or element such as a program, a database, or any other component, device, element, or object capable of initiating an exchange within systems discussed herein. It is to be understood that any number of UEs may be present in systems discussed herein. UE 102 may also include any combination of hardware (e.g., communications units, receiver(s), transmitter(s), antenna(s) and/or antenna array(s), processor(s), memory element(s), baseband processor(s) (modems), etc.)], controllers, software, logic, and/or the like to facilitate any combination of WWA access network connections. In some instances, UE 102 may also be capable of WLA access network interface connections (e.g., Wi-Fi® connections, etc.) and/or wired interface connections (e.g., Ethernet, etc.). UE 102 may also be configured with a Subscriber Identity Module (SIM), which may include any combination of an electronic or embedded SIM (eSIM), a Universal SIM (USIM), an integrated SIM (iSIM), and/or the like, which may be referred to herein as (e)SIM 104 or USIM/cSIM 104. It is to be understood that any references to iSIM, USIM, or eSIM herein can be used interchangeably to refer to any type of SIM configured for a UE and provisioned with one or more SIM profiles.

A profile or information provisioned for a UE (e)SIM, such as for (e)SIM 104 of UE 102, may be provisioned with mobile user/subscriber and/or device information, such as an International Mobile Subscriber Identity (IMSI), Subscription Concealed Identifier (SUCI), or the like; authentication material, such as authentication algorithms or the like; Location Area Identity (LAI); and/or any other information that may enable a device to attach to a WWA access network (e.g., a 4G/5G/nG access network). In some embodiments, an eSIM/USIM profile may be provisioned with Radio Access Technology (RAT) type information, network identifier (ID) information, and/or capability information for UE 102 indicating a capability of the UE to perform the secondary authentication process facilitated via techniques presented herein.

An AMF, such as AMF 120, is typically associated with 3GPP 5G/nG mobile network implementations, whereas an MME is typically associated with 3GPP 4G/LTE implementations, including 4G/LTE Control and User Plane Separation (CUPS) architectures. An AMF (for 3GPP 5G implementations) and/or an MME (for 3GPP 4G/LTE implementations) may perform similar mobile network operations. For example, in addition to various operations discussed for techniques herein, an AMF and/or MME, such as AMF 120 and/or AMF/MME 136, may provide access authentication services, authorization services, and mobility management control for one or more UE, such as UE 102, to facilitate one or more over-the-air Radio Frequency (RF) connection(s) between the UE and a given access network (e.g., public WWA access network 112/WWA radio node 114 for AMF 120 and private WWA access network 132/WWA radio node 134 for AMF/MME 136).

Similarly, an SMF, such as SMF 122, is typically associated with 3GPP 5G/nG mobile network implementations, whereas a PGW-C is typically associated with 3GPP 4G/LTE CUPS implementations. An AMF (for 3GPP 5G implementations) and/or a PGW-C(for 3GPP 4G/LTE CUPS implementations) may perform similar mobile network operations. For example, in addition to various operations discussed for techniques herein, an SMF and/or PGW-C, such as SMF 122 and/or SMF/PGW-C 138, may be responsible for UE PDU or PDN (for 4G/LTE) Session Management (SM), with individual functions/services being supported on a per-session basis, and also for selection and control of a UPF (e.g., UPF 124) or PGW-U (e.g., UPF/PGW-U 140) to facilitate data transfer(s) between a UE and one or more data network(s), such as enterprise data network 144.

A UPF, such as UPF 124 typically associated with a 3GPP 5G/nG mobile network implementation, whereas a PGW-U is typically associated with 3GPP 4G/LTE CUPS implementations. A UPF (for 3GPP 5G implementations) and/or a PGW-U (for 3GPP 4G/LTE CUPS implementations) may perform similar mobile network operations. For example, in addition to various operations discussed for techniques herein, a UPF and/or PGW-U, such as UPF 124 and/or UPF/PGW-U 140, may operate to provide routing and forwarding operations for user data traffic and may also perform a variety of functions/services including, but not limited to, packet inspection, traffic optimization, Quality of Service (QOS), billing, policy enforcement, and/or billing operations (e.g., accounting, etc.) for UE sessions An AUSF, such as AUSF 116, is typically associated with 3GPP 5G/nG mobile network implementations. Typically, the AUSF 116 facilitates primary authentication for authenticating a device, such as UE 102, to connect to the public WWA access network 112/WWA radio node 114. A UDM, such as UDM 118, is also typically associated with 3GPP 5G/nG mobile network implementations. Typically, the UDM 118 stores subscription data for subscribers (e.g., UE 102) that can be retrieved and/or otherwise obtained/utilized by one or more network elements of MNO/SP domain 110 to facilitate authentication, services, etc. for subscribers. Although not illustrated, it is to be understood that enterprise domain 130 may also be configured with an AUSF, a UDM, and/or any other 4G/LTE, 5G, and/or nG elements now known here and/or hereafter developed in various embodiments. Additionally MNO/SP domain 110 may also be configured with any other 5G and/or nG elements now known here and/or hereafter developed in various embodiments. In some implementations, MNO/SP domain 110 may also be configured to provide 4G/LTE mobile network services.

In addition to various operations discussed herein, DN-AAA 146 may facilitate any combination of authentication, authorization, and/or accounting services that may be utilized via any combination of authentication/authorization protocols such as Remote Authentication Dial-In User Service (RADIUS), Diameter, EAP [including any EAP variations], combinations thereof, and/or the like. Local AAA(s) 142, if implemented, may also facilitate such services.

Generally, authentication refers to a process in which an entity's identity is authenticated, typically by providing evidence that it holds a specific digital identity such as an identifier/identity and corresponding credentials/authentication attributes/etc. Generally, authorization can be used to determine whether a particular entity is authorized to perform a given activity, typically inherited from authentication when logging on to an application or service. In various instances, authorization may be determined based on a range of restrictions, for example time-of-day restrictions, or physical location restrictions, or restrictions against multiple accesses by the same entity or user/device. Generally, accounting refers to the tracking of network resource consumption by users/devices for the purpose of capacity and trend analysis, cost allocation, billing, etc.

In some embodiments, AUSF 116, UDM 118, AMF 120, SMF 122, and UPF 124 may be implemented as virtualized network functions (NFs) operating on compute resources of one or more server(s), server rack(s), etc. across one or more data centers associated with the MNO/SP domain 110. In some instances, the MNO/SP can configure the virtualized NFs using a network slicing model in which each of a given network slice, including instances of each of the virtualized NFs (e.g., AUSF, UDM, AMF, SMF, UPF, etc.), can be configured to provide services for each of a given enterprise entity. In this manner, the MNO/SP domain can provide mobile network services to an enterprise using a slice (e.g., an enterprise slice) that can be accessed via public WWA access network 112.

In some embodiments, any of AMF/MME 136, SMF/PGW-C 128, and/or UPF/PGW-U 140 may also be implemented as virtualized NFs within enterprise domain 130.

As noted previously, system 100 may facilitate fast roaming between MNO/SP domain 110 and enterprise domain 130. Consider an operational example involving UE 102 fast-roaming from public WWA access network 112 into private WWA access network 132, as generally illustrated in FIG. 1 via operations 150, 151, 152, 153, 154, 155, 156, 157, 158, and 159.

Say, for example, that an MNO 'Operator.com' has a business relationship with an enterprise 'Enterprse.com' and that the MNO has created a customer specific network slice for the enterprise, 'Enterprise-Slice'. UE 102, via (e)SIM 104 may be provisioned with an MNO/SP (e)SIM profile associated with Operator.com and an enterprise (e)SIM profile associated with Enterprise.com.

UDM 118 can be configured with policy information associated with any of the Enterprise.com users (e.g., using a USIM/eSIM identity for enterprise users associated with Operator.com) that identifies that secondary authentication is enabled for a PDU session for the users. Thus, in this example, UDM can be configured with subscription (policy) information for an employee, 'User-1' operating UE 102 associated with Enterprise.com. In one embodiment, subscription information for User-1/UE 102 can include an indication of whether secondary authentication is to be performed for the subscriber (e.g., 'Secondary Auth=YES or NO'), an identifier for the secondary authentication realm (e.g., 'Secondary Auth Realm=Enterprise.com'), and authentication type for the secondary authentication (e.g., 'Auth Type=USIM' or 'Auth Type=cSIM'), and/or a private WWA access network identifier (e.g., 'PrivateNetworkId').

In this example, the DN-AAA 146 server belonging to enterprise domain 130 supporting Diameter interfaces may be configured as the authentication server for the realm Enterprise.com. Consider, for the present example, that User-1 of Enterprise.com turns on their phone (e.g., UE 102) in the morning at 8:00 AM on the way to work such that the UE 102 attaches to the SP public WWA access network 112/WWA radio node 114 in which network connectivity is facilitated via the Enterprise-Slice and first completes a primary authentication 150 with AUSF 116 using the MNO/SP (e)SIM profile for UE 102 (as provisioned for (e)SIM 104).

During PDU session establishment for the MNO/SP domain 110, SMF 122 fetches the UE 102 subscription information/profile from UDM 118, as shown at 151, in order to determine that the secondary authentication process is to be initiated for UE 102 (e.g., 'Secondary Auth=YES'). Through the PDU session establishment and subsequent to the primary authentication, UE 102 performs and completes a secondary authentication process (e.g., using (e)SIM credentials associated with Enterprise.com) with the DN-AAA 146, authorized for the Enterprise.Com realm, as shown at 152.

In some embodiments, UE 102 (*e*)SIM credentials (e.g., as provisioned for (e)SIM 104) associated with an enterprise domain can indicate a RAT type and/or a private network identifier (ID) (e.g., private WWA access network ID), and/or can indicate a fast roaming capability of the UE, which indicates its capability to use secondary authentication generated authentication material (e.g., security key(s)) during subsequent authentication into an enterprise private WWA access network/enterprise domain.

In at least one embodiment, secondary authentication via DN-AAA 146 can involve an EAP Authentication and Key Agreement (EAP-AKA) method/function/logic running in DN-AAA 146 that can be triggered to facilitate generation of authentication material, such as a root key, by UE 102 and also by DN-AAA that can be subsequently utilized for authenticating the UE 102 into private WWA access network 132/enterprise domain 130. In various embodiments, authentication material such as a root key may be inclusive of an Access Security Management Entity Key (KASME or $K_{ASME}$) for 4G/LTE accesses, an AMF Key (K-AMF or $K_{AMF}$) for 5G/nG accesses, and/or the like.

EAP-AKA logic configured for UE 102 and for DN-AAA 146 can perform operations for generating the authentication material (also referred to herein as root or security keys), such as the KASME/K-AMF, according to techniques as prescribed at least by Internet Engineering Task Force (IETF) Request For Comments (RFC) 4187, RFC 5448 (improved EAP-AKA, often referred to as EAP-AKA'), and RFC 4072 (Diameter EAP application).

Although techniques presented herein are discussed with reference to EAP-AKA mechanisms for authentication, this is not meant to limit the broad scope of the present disclosure. In various implementations, other authentication mechanisms/protocols may be utilized as may be understood in the art, now known here and/or hereafter developed, which may or may not result in the generation of different authentication material that may be utilized for authenticating users/devices to various access types.

UE 102 can store the KASME/K-AMF that it generates during the secondary authentication process and DN-AAA 146 can also store the KASME/K-AMF that it generates during the secondary authentication process. Additional details regarding generation of authentication material by UE 102 and DN-AAA 146 are discussed below with reference to FIGS. 2A-2D.

Through the secondary authentication process for UE 102, DN-AAA 146 can provide, as shown at 153, enterprise specific policies to the MNO/SP network for the enterprise data network 144, which can be identified by a Data Network Name (DNN) for 5G implementations and/or an Access Point Name (APN) for 4G/LTE implementations.

Upon successful generation of the authentication material for the secondary authentication process for UE 102, DN-AAA 146 can generate and transmit an authentication success message toward UE 102 that includes an identifier for the UE 102 to utilize for fast roaming into the enterprise private WWA access network 132 and also includes an identifier for the DN-AAA 146 that can be utilized by the MME/AMF 136 within the enterprise domain 130 to identify the correct AAA node/service (e.g., DN-AAA 146) from which to obtain the authentication material for UE 102.

In at least one embodiment, the authentication success message may be a Diameter-EAP-Answer (DEA) including 'EAP-Payload' of a type 'EAP-Success' that may include an Attribute Value Pair (AVP) that includes a UE identifier and a DN-AAA identifier. In at least one embodiment, the UE identifier may be a pseudo-IMSI (e.g., an identifier generated for the UE in an IMSI format but not being the authentic USIM/eSIM IMSI configured for the UE), a fast re-authentication identifier (Fast Reauth-ID) for 4G/LTE, a SUCI, and/or the like.

The UE 102 can cache the authentication material obtained from the secondary authentication process in its (e)SIM profile in association with enterprise credentials for the enterprise domain 130 realm (e.g., Enterprise.com) and an identifier for private WWA access network 132. In one embodiment in which WWA radio node 134 may be implanted as an nG/CBSD, an identifier for private WWA access network 132 may include a Public Land Mobile Network Identifier (PLMN ID) and a Network Identifier (NID), which may be represented as 'PLMN+NID'.

Once, the PDU session is established via MNO/SP domain 110 consider for the present example that User-1/UE 102 joins a video conference call on the way to work via public WWA access network 112/WWA radio node 114.

Next, consider at 154 that User-1/UE 102 enters the basement of an office in Paris and is now in the vicinity/coverage area of the Enterprise.com's private WWA access network 132/WWA radio node 134. In at least one embodiment, private WWA radio node 134 for private WWA access network 132 can be configured to broadcast an indication that the private WWA access network 132 supports fast roaming.

As UE 102 determines that it has moved into the coverage area of private WWA access network 132/WWA radio node 134 (e.g., based on broadcasts obtained from the private WWA access network 132/WWA radio node 134), UE 102 generates integrity and ciphering keys, as shown at 155, according to processes prescribed at least by 3GPP Technical Specification (TS) 24.301 using KASME/K-AMF in which the secondary node ID (SN-ID) is set to the identifier for the private WWA access network 132 (e.g., PLMN+NID). The integrity and ciphering keys can be used to facilitate Non-Access Stratum (NAS) and Access Stratum (AS) encryption for UE 102 communications.

As User-1 enters a building of the enterprise entity, consider that the UE 102 loses connection to public WWA access network 112 and attaches/registers with the private WWA access network 132/private WWA radio node 134, as shown at 156. Through the registration, UE 102 may provide an indication that it has already generated NAS/AS encryption and ciphering keys for the enterprise domain 130, may provide the identifier for DN-AAA 146 obtained from the secondary authentication process, and may provide the identifier for the UE obtained from the secondary authentication process.

As shown at 157, AMF/MME 136 identifies the DN-AAA 146 using the identifier obtained via the UE 102 registration and obtains the authentication material/security keys (e.g., KASME/K-AMF) from DN-AAA 146. As shown at 158, AMF/MME 136 generates NAS key material ($K_{NAS}$) including ciphering and integrity keys and provisions private WWA radio node 134 with AS key material (e.g., $K_{eNB/gNB}$), which enables private WWA radio node 134 to generate Radio Resource Control (RRC) and user plane (UP) ciphering and integrity keys (e.g., $K_{RRC}$ and $K_{UP}$).

As shown at 159, UE 102 NAS, RRC, and UP sessions are established and the video conference call may reconnect such that there may be minimal packet loss (compared to not having capabilities as described herein) as the UE 102 performs a non-seamless handoff for fast roaming from public WWA access network 112 into enterprise private WWA access network 132. For example, in one instance, the UE 102 may continue to use its public 5G link while it completes authentication with a private 5G access network (e.g., WWA access network 132). In this instance, the video conference flow will switch over to the private 5G access when the network is available for use and based on the UE policy. Such operations may be similar to a make-before-break use case with near zero packet loss. In another instance, the UE 102 may lose connectivity with the public 5G link, but may detect the private 5G network. In this instance, the UE can complete the authentication process and the flow can switch over to the private 5G access. In this scenario, which may be similar to a break-before-make use case, there may be some packet loss but given optimizations in the authentication flow as provided by techniques herein (e.g., approximately six less messages/exchanges as compared to traditional authentication processes), packet loss may be minimized. Thus, in accordance with techniques herein, the NAS, RRC, and UP sessions can be established without NAS and AS security exchanges between the UE 102 and the enterprise domain 130 that would have otherwise been performed had the authentication material from the secondary authentication process not previously been stored by both the UE 102 and the DN-AAA 146. Accordingly, many of the steps in the authentication procedure to the enterprise domain 130 can be skipped as security was pre-established as part of the secondary authentication process 152 previously performed via the MNO/SP domain 110.

Additional details regarding the secondary authentication process are discussed below with reference to FIGS. 2A, 2B, 2C, and 2D, which are message sequence diagrams of a call flow 200 illustrating example details associated with facilitating fast roaming between the MNO/SP public WWA access network 112 and the enterprise private WWA access network 132 via the system of FIG. 1, according to an example embodiment. FIGS. 2A-2D include AUSF 116, UDM 118, AMF 120, SMF 122, and UPF 124 of MNO/SP domain 110 and also (private) WWA radio node 134, AMF/MME 136, UPF/PGW-U 140, and DN-AAA 146 of enterprise domain 130. Also shown in FIGS. 2A-2D are UE 102.

For the embodiment of FIGS. 2A-2D, consider that private WWA access network 132/private WWA radio node 134 is configured as a 5G/nG/CBSD Radio Access Network (RAN) that can be identified by a PrivateNetworkId=PLMN+NID. At 202, consider that an enterprise user (e.g., User-1) associated with UE 102 is subscribed to the public WWA access network 112 via an MNO/SP (e)SIM profile associated with the operator domain 110 (e.g., for realm Operator.com) and is also provisioned with an enterprise (e)SIM profile associated the enterprise domain 130 (e.g., for realm Enterprise.com) that includes PrivateNetworkId=PLMN+NID (e.g., realm, PLMN+NID) for the enterprise private WWA access network 132. It is to be understood that any references to USIM or eSIM for the embodiment of FIGS. 2A-2D can be used interchangeably to refer to any type of SIM configured for a UE.

Further for the embodiment of FIGS. 2A-2D, consider that UDM 118 is configured with a subscription profile for the enterprise user associated with UE 102 that: indicates that a secondary authentication process is to be performed for the enterprise user/UE 102 (e.g., 'Secondary Auth=YES'); includes an identifier for the secondary authentication realm (e.g., 'Secondary Auth Realm=Enterprise.com'); includes an indication of authentication type for the secondary authentication (e.g., 'Auth Type=USIM', for this example); and includes a private WWA access network identifier for private WWA access network 132 (e.g., 'PrivateNetworkId=[PLMN+NID]').

At 204, consider that UE 102, within the coverage area of public WWA access network 112/public WWA radio node 114, sends an attach/registration request to establish a PDU session via MNO/SP domain 110. At 206, primary authentication with the public WWA access network 112 is performed between UE 102 and MNO/SP domain 110 via AUSF 116 using MNO/SP (e)SIM credentials provisioned for UE 102. At 208, NAS security establishment is performed between UE 102 and AMF 120. At 210a, consider that UE 102 transmits a PDU session establishment request that is obtained by AMF 120, which AMF 120 forwards at 210b to SMF 122.

Obtaining the PDU session establishment request triggers SMF 122 to fetch the subscription policy for the enterprise user associated with UE 102 from UDM 118, as shown at 212, to determine whether secondary authentication is to be performed for UE 102 and, if so, to obtain secondary authentication realm information, the authentication type, and the private network ID (PrivateNetworkId). In at least one embodiment, the SMF 122 can query the UDM 118 using the IMSI, SUCI, Network Access Identifier (NAI) (e.g., User-1@enterprise.com), and/or any other identifier for the enterprise user/UE as may be provided for the MNO/SP (e)SIM credentials provisioned for UE 102.

At 214, UDM 118 performs a lookup for the subscription policy based on the SMF 122 query and, based on a successful lookup (e.g., policy is found for enterprise user/UE) provides response to SMF 122, as shown at 216, with subscription information including, but not limited to: the indication that the secondary authentication process is to be performed for the enterprise user/UE 102 (e.g., 'Secondary Auth=YES'); the identifier for the secondary authentication realm (e.g., 'Secondary Auth Realm=Enterprise.com'); the indication of the authentication type for the secondary authentication (e.g., 'Auth Type=USIM', for this example); and the private WWA access network identifier for private WWA access network 132 (e.g., 'PrivateNetworkId= [PLMN+NID]').

Upon obtaining the response at 216 that identifies that the secondary authentication process is to be performed for UE 102, SMF 122 initiates EAP authentication for the PDU session for UE 102, as shown at 218, which include SMF 122 transmitting to UE 102, at 220, an EAP-Request for the identity information of UE 102 that is to be used for the secondary authentication process, 'EAP-Request/Identity', in which the EAP-Request identifies the enterprise realm, the USIM authentication type, and the PLMN+NID private WWA access network ID, such as [Enterprise realm, USIM, PLMN+NID]. At 222, UE 102 responds with an EAP-Response including the identity, 'EAP-Response/Identity', such as 'User-1@enterprise@plmn.nid.com', for example.

Figure 2A:
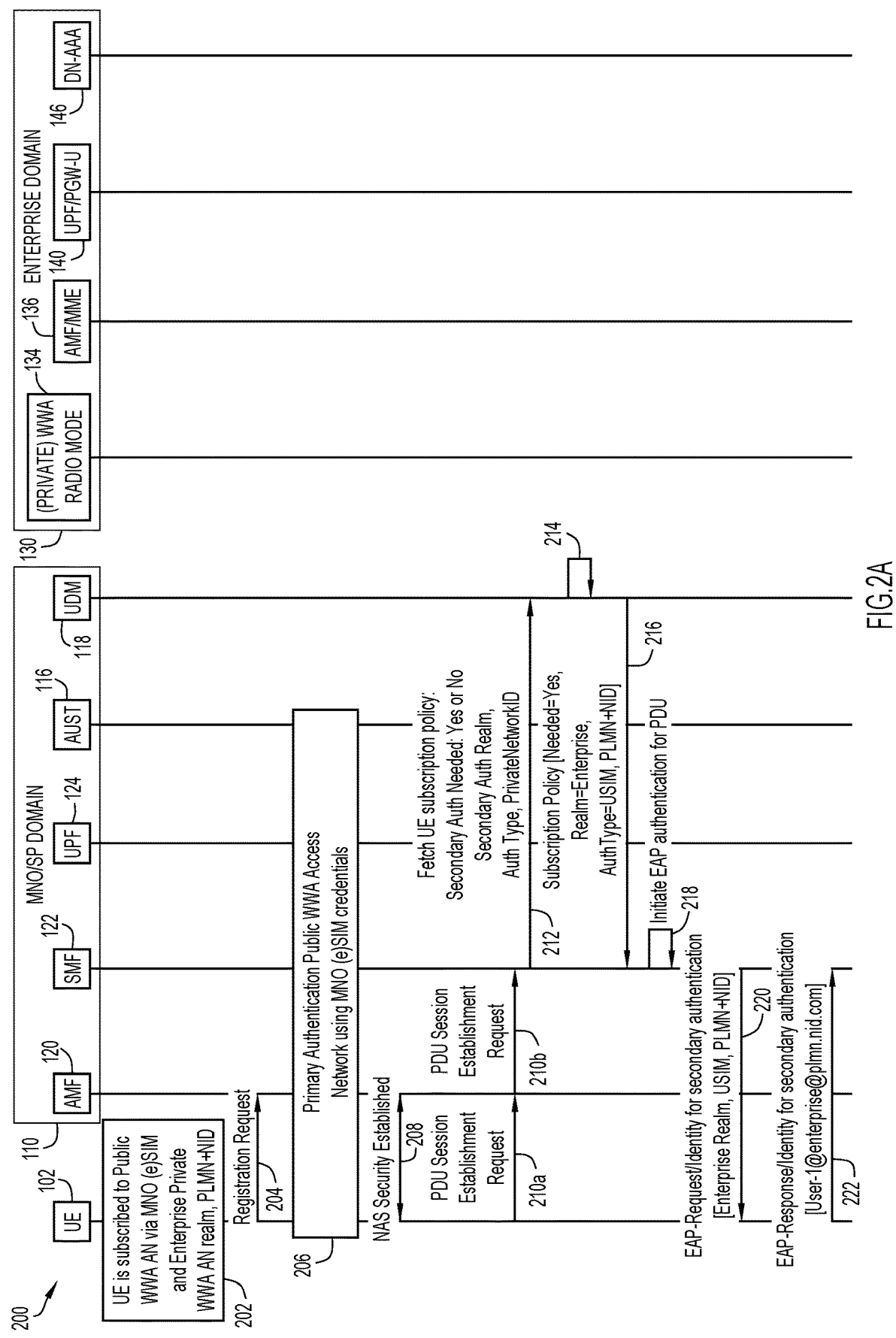
FIGS. 2A, 2B, 2C, and 2D are message sequences diagram of a call flow illustrating example details associated with facilitating fast roaming between the MNO/SP public WWA access network and the enterprise private WWA access network via the system of FIG. 1, according to an example embodiment.
Figure 2B:
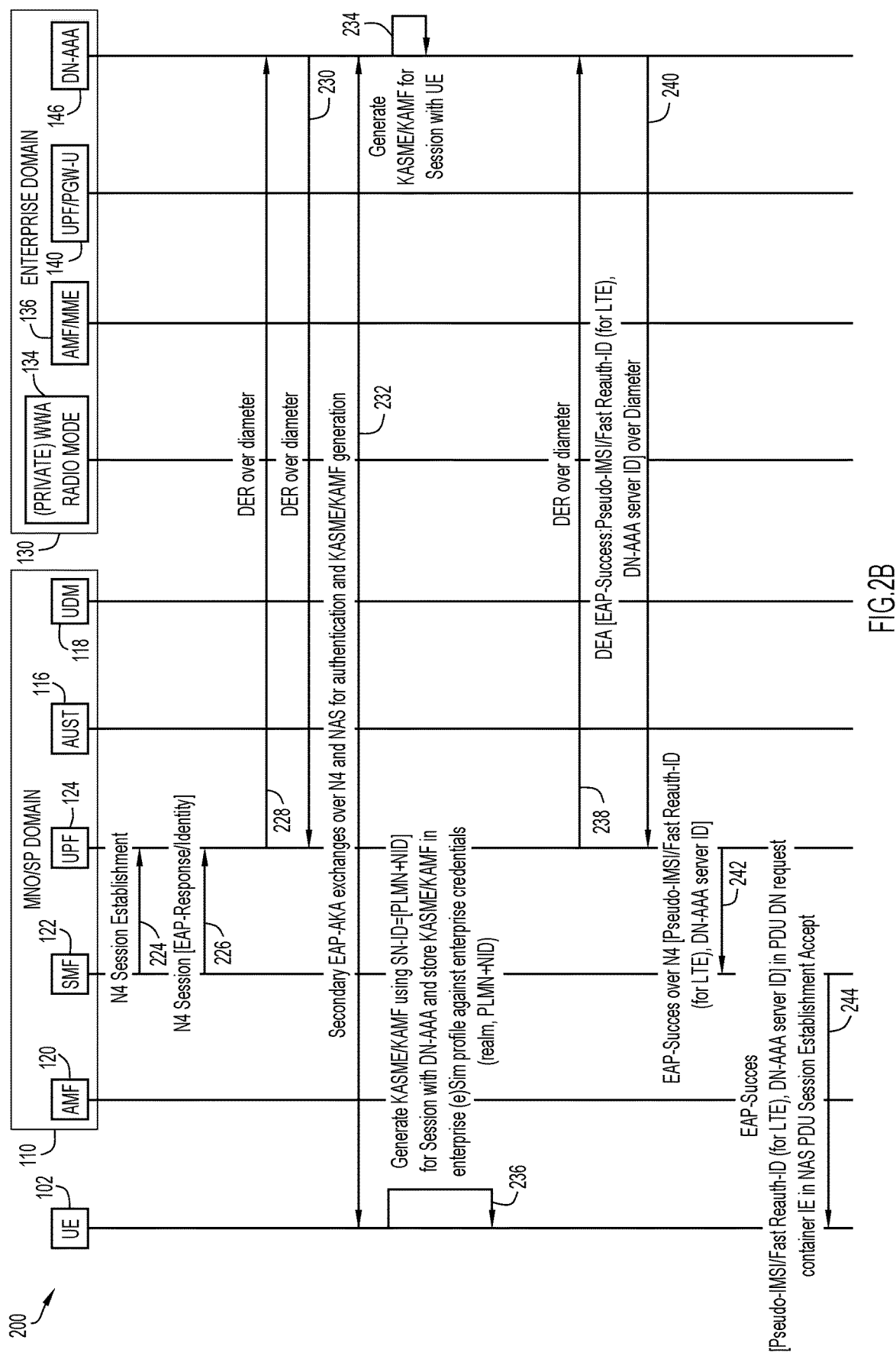

At 224 as shown in FIG. 2B, SMF 122 triggers N4 session establishment with UPF 124 for UE 102 that includes sending to UPF 124, at 226, the EAP-Response/Identity as obtained from UE 102. At 228, UPF 124 communicates a Diameter-EAP-Request (DER) over Diameter to DN-AAA 146 to which DN-AAA 146 can respond with a Diameter-EAP-Answer (DEA) transmitted to UPF 124, as shown at 230. In some instances, DN-AAA 146 may or may not accept the request based on any combination of enterprise policy UE capabilities, UDM profile for the UE, and/or enterprise policy for the UE. At 232, secondary EAP-AKA exchanges are performed between UE 102 and DN-AAA 146 over N4 and NAS for authentication of UE 102 to deliver key material to UE 102 to facilitate the generation of authentication material, for example, root key(s) such as KASME/K-AMF (e.g., as prescribed at least by RFC 4187/5448).

At 234, DN-AAA 146 generates and stores the KASME/K-AMF authentication material for the session with UE 102. At 236, UE 102 generates and stores the KASME/K-AMF authentication material using SN-ID=[PLMN+NID] for the session with DN-AAA 146. The KASME/K-AMF authentication material generation may be performed as prescribed at least by RFC 4187/5448. The KASME/K-AMF authentication material may be stored in the enterprise (e)SIM profile for UE 102. It is to be understood that the operations performed by DN-AAA 146 regarding authentication material generation at 234 and the operations performed by UE 102 regarding authentication material generation at 236 can be performed in any order, in parallel, and/or any combinations thereof.

At 236, the UE 102 also stores the KASME/K-AMF authentication material in the enterprise (e)SIM profile in association with enterprise credentials for enterprise domain 130 as identified by the enterprise realm and private WWA access network identifier, such as [realm, PLMN+NID].

At 238, SMF 122 communicates another DER over Diameter to DN-AAA 146. At 240, DN-AAA 146 generates and transmits to UE 102 based, at least in part, on successful generation of the KASME/K-AMF authentication material for the secondary authentication process for UE 102, an authentication success message of a type EAP success, 'EAP-Success'. The authentication success message may include an AVP that includes a UE identifier that can be used to identify UE 102 and a DN-AAA identifier that can be used for identifying DN-AAA 146. In at least one embodiment, the UE identifier may be a pseudo-IMSI, a fast re-authentication identifier (Fast Reauth-ID) for 4G/LTE, a SUCI, and/or the like that may be used to identify UE 102. In at least one embodiment, the DN-AAA identifier may be any alphanumeric string/value, binary value, hexadecimal value, a Fully Qualified Domain Name (FQDN) (e.g., dnaaa.enterprise.com), an IP address, and/or the like that can be used to uniquely identify the DN-AAA 146 within enterprise domain 130.

At 242, UPF 124 transmits the authentication success message including the UE 102 identifier and the DN-AAA 146 identifier over the N4 interface to SMF 122, which transmits the authentication success message to UE 102, as shown at 244. In at least one embodiment, the SMF 122 may include the authentication success message including the UE 102 identifier and the DN-AAA 146 identifier in a PDU Data Network (DN) request container Information Element (IE) within a NAS PDU Session Establishment Accept message transmitted to the UE 102. As noted above, at 236, UE 102 may store the KASME/K-AMF authentication material in the enterprise (e)SIM profile in association with enterprise credentials for enterprise domain 130 as identified by the enterprise realm and private WWA access network identifier, such as [realm, PLMN+NID].

Figure 2C:
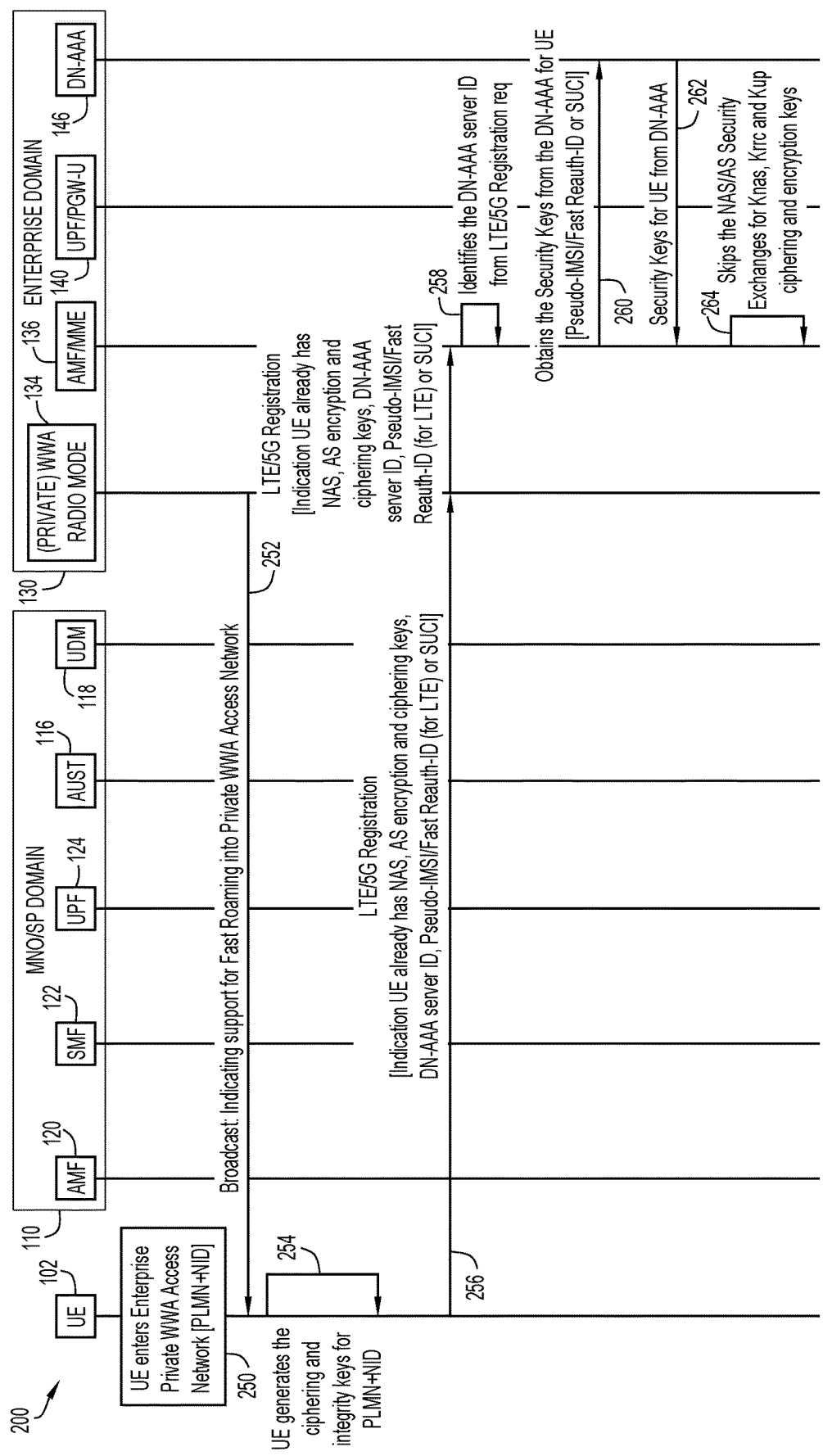
Figure 2D:
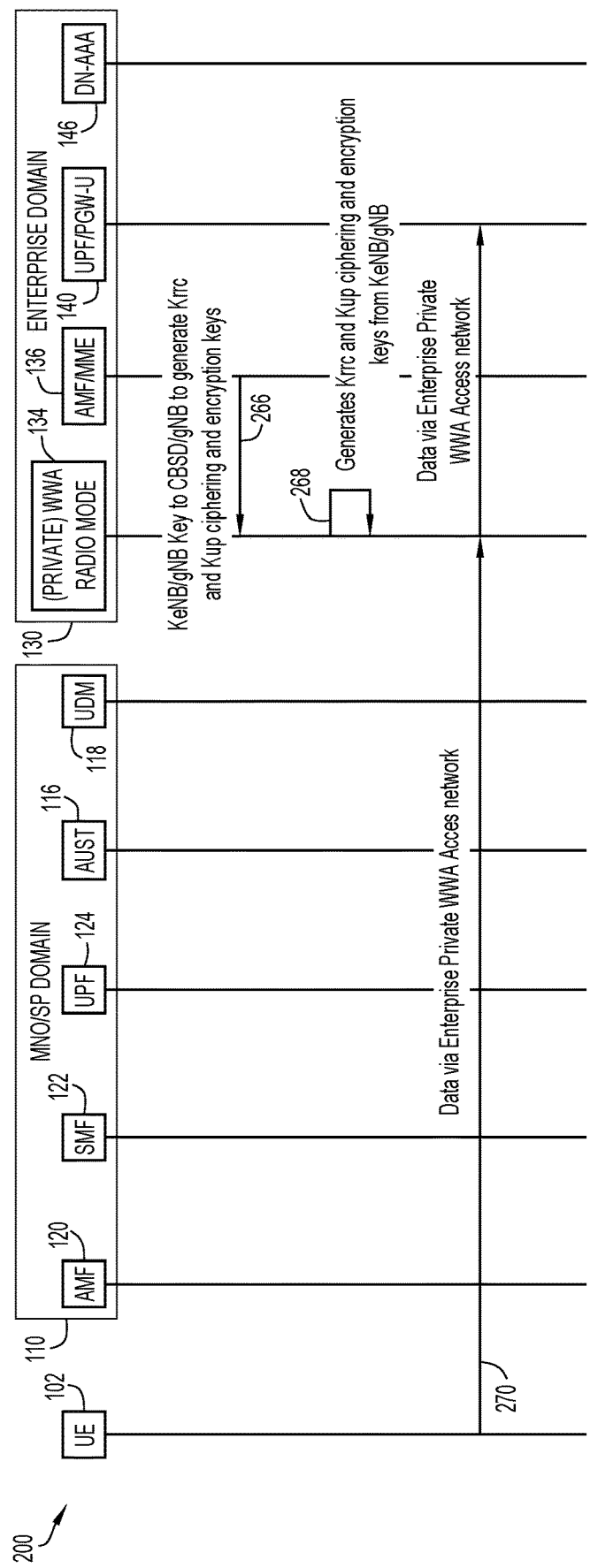

Consider for the embodiment of FIGS. 2A-2D, that UE 102 later moves and enters the coverage of the private WWA access network 132/private WWA radio node 134 identified by [PLMN+NID], as shown at 250 for FIG. 2C. In at least one embodiment, private WWA radio node 134 can be configured to broadcast an indication that the enterprise domain supports fast roaming into the private WWA access network 132. As shown at 252, the broadcast can be obtained by UE 102.

Upon obtaining the broadcast and determining that the private WWA access network supports fast roaming, UE 102 may generate ciphering and integrity keys based on the network identifier PLMN+NID, as shown at 254. At 256, UE 102 communicates a 4G/LTE/5G registration request to the enterprise domain 130 via private WWA radio node 134 that is obtained by AMF/MME 136 and includes: an indication that it has already generated NAS/AS encryption and ciphering keys for the enterprise domain 130; the identifier for DN-AAA 146 obtained from the secondary authentication process; and the user/UE 102 identifier obtained from the secondary authentication process. In various embodiments, any of an Information Element (IE), AVP, flag, byte, value, and/or the like can be set by the UE to indicate via the registration request that that the UE has already generated NAS/AS encryption and ciphering keys for a given enterprise domain.

AMF/MME 136, upon obtaining the 4G/LTE/5G registration request, identifies the DN-AAA 146 based on the identifier contained in the registration request, as shown at 258, and further triggers a query to DN-AAA 146, as shown at 260, using the UE 102 identifier contained in the registration request to obtain the authentication material (e.g., KASME/K-AMF security keys). At 262, DN-AAA 146 transmits a response to the query from AMF/MME 136 that includes the KASME/K-AMF authentication material/security keys previously generated for UE 102 during the secondary authentication process, as discussed previously at 234.

Upon obtaining the authentication material/security keys, AMF/MME 136 determines, at 264, that it can skip NAS/AS security exchanges that would otherwise be involved for $K_{NAS}$, $K_{RRC}$, and $K_{UP}$ ciphering and encryption key generation had the previous secondary authentication process not been perform in accordance with embodiments herein. Based on the determination that the NAS/AS security exchanges can be skipped, AMF/MME 136 provisions the $K_{eNB/gNB}$ for the private WWA radio node 134, as shown at 266 for FIG. 2D, to facilitate generation of the $K_{RRC}$ and $K_{UP}$ ciphering and encryption keys at the private WWA radio node 134, as shown 268, using 3GPP standards-based procedures. Following successful securing of NAS/AS communications for the enterprise domain 130, a connection between the UE 102 and the private WWA radio node 134/enterprise domain 130 is established such that data communications can be exchanged between UE 102 and the enterprise data network 144 via UPF/PGW-U 140 utilizing the private WWA access network 132, as shown at 270.

Accordingly, techniques herein provide approaches for extending 3GPP secondary authentication to facilitate fast roaming between an MNO/SP public WWA access network and an enterprise private WWA access network.

Referring to FIG. 3, FIG. 3 is a flow chart depicting a method 300 according to an example embodiment. In particular, method 300 may be associated with operations that may be performed by an authentication node, such as DN-AAA 146, to facilitate fast roaming for a UE, such as UE 102, between an MNO/SP public WWA access network of an MNO/SP domain and an enterprise private WWA access network of an enterprise domain (e.g., to facilitate fast roaming between public WWA access network 112 of MNO/SP domain 110 and private WWA access network 132 of enterprise domain 130).

At 302, the method may include generating, by an authentication node, authentication material (e.g., KASME/K-AMF) for a UE based on the UE being connected to a public WWA access network in which the public WWA access network is associated with an MNO/SP for an MNO/SP domain, and the authentication node and the UE are associated with an enterprise entity for an enterprise domain.

At 304, the method may include obtaining, by the authentication node, an indication that the UE is attempting to access a private WWA access network associated with the enterprise entity. For example, the authentication node may receive a query from an AMF/MME (e.g., AMF/MME 136) to obtain the authentication material for the UE following a registration request obtained by the AMF/MME for the UE fast roaming into the private WWA access network.

At 306, the method may include providing, by the authentication node, the authentication material for the UE in which the authentication material facilitates connection establishment between the UE and the private WWA access network (e.g., for one or more data communications between the UE and a data network of the enterprise domain).

Figure 4:
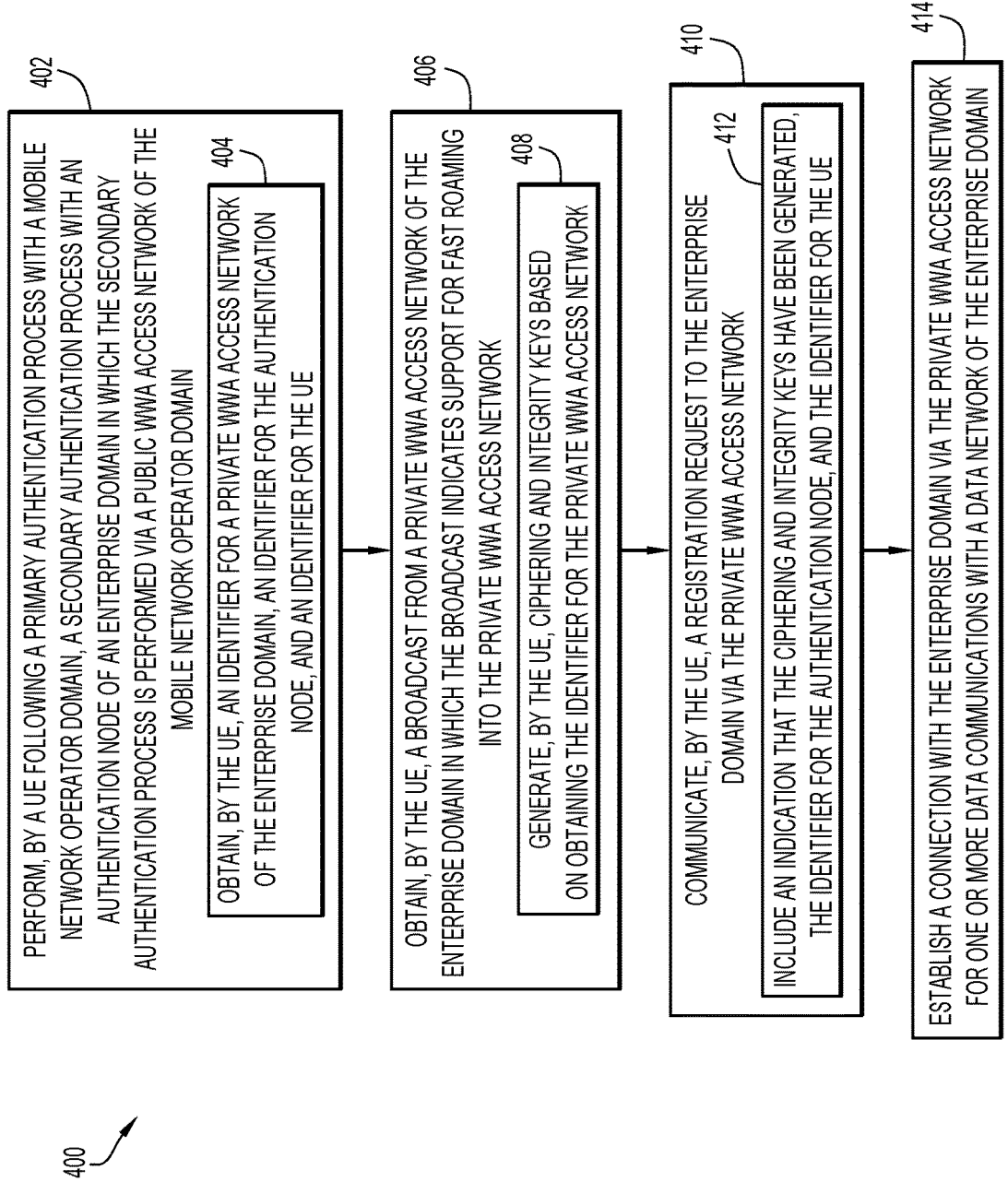
FIG. 4 is another flow chart depicting another method according to an example embodiment.

Referring to FIG. 4, FIG. 4 is a flow chart depicting a method 400 according to an example embodiment. In particular, method 400 may be associated with operations that may be performed by a UE, such as UE 102, to facilitate fast roaming for the between an MNO/SP public WWA access network of an MNO/SP domain and an enterprise private WWA access network of an enterprise domain (e.g., to facilitate fast roaming between public WWA access network 112 of MNO/SP domain 110 and private WWA access network 132 of enterprise domain 130).

At 402, the method may include performing, by a UE following a primary authentication process with a mobile network operator domain, a secondary authentication process with an authentication node of an enterprise domain in which the secondary authentication process is performed via a public WWA access network of the mobile network operator domain. In at least one embodiment, the secondary authentication process may include, as shown at 404, obtaining, by the UE, an identifier for a private WWA access network of the enterprise domain (e.g., PLMN+NID), an identifier for the authentication node, and an identifier for the UE.

At 406, the method may include obtaining, by the UE, a broadcast from the private WWA access network of the enterprise domain in which the broadcast indicates support for fast roaming into the private WWA access network. In at least one embodiment, obtaining the broadcast by the UE may trigger the UE to generate ciphering and integrity keys based on obtaining the identifier for the private WWA access network, as shown at 408.

At 410, the method may include communicating, by the UE, a registration request to the enterprise domain via the private WWA access network. In at least one embodiment, as shown at 412, the registration request may include, at least in part: an indication that ciphering and integrity keys have already been generated by the UE, the identifier for the authentication node (obtained via the secondary authentication process), and the identifier for the UE (obtained via the secondary authentication process).

At 414, the method may include the UE establishing a connection with the enterprise domain via the private WWA access network for one or more data communications with a data network of the enterprise domain.

In summary, techniques herein provide approaches for extending 3GPP secondary authentication to facilitate fast roaming between an MNO/SP public WWA access network and an enterprise private WWA access network. Such techniques may include, but not be limited to, techniques to perform secondary authentication via a public WWA access network network using USIM/eSIM credentials associated with an enterprise realm in which the secondary authentication is designed for DNN authentication. This may represent a new technique for using enterprise USIM/eSIM credentials and key generation via a public WWA access network for fast roaming into a private WWA access network.

Further provided herein are techniques for generating WWA access network ciphering and encryption keys that can be later utilized for access to an enterprise private WWA access network network as part of the secondary authentication through a MNO/SP public WWA access network. Further provided herein are techniques involving a DN-AAA initiating 5G and/or 4G/LTE key exchange operations based on any combination of UE capability, UDM subscription profile, and/or enterprise policy. Further provided herein are techniques involving a DN-AAA (e.g., DN-AAA 146) accepting or rejecting 5G and/or 4G/LTE key exchange operations based on any combination of UE capability, UDM profile, and/or enterprise policy.

Further provided herein are techniques involving a DN-AAA providing a pseudo-IMSI, Fast Reauth-ID, SUCI, and/or the like for a UE as part of EAP-Success messaging during secondary authentication by a private enterprise over a public WWA access network network, which may facilitate IMSI concealing during subsequent private WWA access network attach procedures. Further provided herein are techniques involving a UE, such as UE 102, caching or otherwise storing the authentication material/keys generated via a secondary authentication process, and furthermore associating them with enterprise network identifiers (e.g., PLMN+NID, etc.). Further provided herein are techniques involving fast roaming into a private enterprise WWA access network using ciphering and encryption keys generated based on secondary authentication performed over an MNO/SP WWA access network. Further, provided herein are techniques involving private enterprise network elements (e.g., AMF/MME 136) and a DN-AAA server (DN-AAA 146) to identify and correlate a user session as the user triggers a 4G/5G attach/registration request.

Referring to FIG. 5, FIG. 5 illustrates a hardware block diagram of a computing device 500 that may perform functions associated with operations discussed herein in connection with the techniques depicted in FIGS. 1-4. In various embodiments, a computing device, such as computing device 500 or any combination of computing devices 500, may be configured as any elements/devices/nodes as discussed for the techniques depicted in connection with FIGS. 1-4 such as, for example, DN-AAA 146, UE 102, AMF 120, SMF 122, UPF 124, AMF/MME 136, UPF/PGW-U 140, WWA radio nodes 114/134, etc.).

It should be appreciated that FIG. 5 provides only an illustration of one embodiment and does not imply any limitations with regard to the environments in which different embodiments may be implemented. Many modifications to the depicted environment may be made.

As depicted, the computing device 500 includes a bus 512, which provides communications between computer processor(s) 514, memory 516, persistent storage 518, at least one communications unit 520, and input/output (I/O) interface(s) 522. Bus 512 can be implemented with any architecture designed for passing data and/or control information between processors (such as microprocessors, communications and network processors, etc.), system memory, peripheral devices, and any other hardware components within a system. For example, bus 512 can be implemented with one or more buses.

Memory 516 and persistent storage 518 are computer readable storage media, which can be inclusive on non-transitory computer readable storage media. In the depicted embodiment, memory 516, which may be inclusive of one or more memory element(s), includes random access memory (RAM) 524 and cache memory 526. In general, memory 516 can include any suitable volatile or non-volatile computer readable storage media. Instructions for control logic 540 may be stored in memory 516 and/or persistent storage 518 for execution by processor(s) 514. In at least one embodiment, control logic 540 may include EAP-AKA logic for performing one or more operations described herein.

In one example, when the processor(s) 514 execute control logic 540, the processor(s) 514 are caused to perform the operations described above in connection with FIGS. 1-4. For example, if computing device 500 is configured as an authentication node, such as DN-AAA 146, when the processor(s) 514 execute control logic 540, the processor(s) 514 are caused to perform operations including, but not limited to, generating authentication material for a UE based on the UE being connected to a public WWA access network in which the public WWA access network is associated with a mobile network operator, and the authentication node and the UE are associated with an enterprise entity; obtaining an indication that the UE is attempting to access a private WWA access network associated with the enterprise entity; and providing the authentication material for the UE in which the authentication material facilitates connection establishment between the UE and the private WWA access network.

In another example, if computing device 500 is configured as a UE, such as UE 102, when the processor(s) 514 execute control logic 540, the processor(s) 514 are caused to perform operations including, but not limited to, performing, by the UE following a primary authentication process with a mobile network operator domain, a secondary authentication process with an authentication node of an enterprise domain in which the secondary authentication process is performed via a public WWA access network of the mobile network operator domain and the secondary authentication process; obtaining, by the UE, a broadcast from the private WWA access network of the enterprise domain in which the broadcast indicates support for fast roaming into the private WWA access network; communicating, by the UE, a registration request to the enterprise domain via the private WWA access network; and establishing a connection with the enterprise domain via the private WWA access network for one or more data communications with a data network of the enterprise domain.

One or more programs and/or other logic may be stored in persistent storage 518 for execution by one or more of the respective computer processors 514 via one or more memory element(s) of memory 516. The persistent storage 518 may be a magnetic hard disk drive, a solid-state hard drive, a semiconductor storage device, read-only memory (ROM), erasable programmable read-only memory (EPROM), flash memory, or any other computer readable storage media that is capable of storing program instructions or digital information.

The media used by persistent storage 518 may also be removable. For example, a removable hard drive may be used for persistent storage 518. Other examples include optical and magnetic disks, thumb drives, and smart cards that are inserted into a drive for transfer onto another computer readable storage medium that is also part of persistent storage 518.

Communications unit 520, in these examples, provides for communications with other data processing systems, networks, and/or devices. In these examples, each communications unit 520 may include at least one interface (IF) 521, which may facilitate communications with systems, networks, and/or devices utilizing any combination of hardware, software, etc. to facilitate one or more connections for communications discussed herein. Accordingly, communications unit 520 may provide communications through the use of any combination of physical and/or wireless communications links.

I/O interface(s) 522 allows for input and output of data with other devices that may be connected to computing device 500. For example, I/O interface 522 may provide a connection to external devices 528 such as a keyboard, keypad, a touch screen, and/or some other suitable input device. External devices 528 can also include portable computer readable storage media such as database systems, thumb drives, portable optical or magnetic disks, and memory cards.

Software and data used to practice embodiments can be stored on such portable computer readable storage media and can be loaded onto persistent storage 518 via I/O interface(s) 522. I/O interface(s) 522 may also connect to a display 530. Display 530 provides a mechanism to display data to a user and may be, for example, a computer monitor.

In one form, a computer-implemented method is provided that may include generating, by an authentication node, authentication material for a user equipment (UE) based on the UE being connected to a public wireless wide area (WWA) access network, wherein the public WWA access network is associated with a mobile network operator, and the authentication node and the UE are associated with an enterprise entity; obtaining, by the authentication node, an indication that the UE is attempting to access a private WWA access network associated with the enterprise entity; and providing, by the authentication node, the authentication material for the UE, wherein the authentication material facilitates connection establishment between the UE and the private WWA access network.

In at least one instance, the generating is performed based on a secondary authentication process for the UE that is subsequent to a primary authentication process for the UE in which the primary authentication process enables the UE to be connected to the public WWA access network. In at least one instance, the secondary authentication process may be performed based on subscription information associated with the UE. In at least one instance, the secondary authentication process is an Extensible Authentication Protocol (EAP) authentication process. In at least one instance, the authentication material may include at least one of an Access Security Management Entity Key (KASME or $K_{ASME}$); and an Access and Mobility Management Function Key (K-AMF or $K_{AMF}$).

In at least one instance, the method may further include generating, by the authentication node, an authentication success message based on successful generation of the authentication material for the secondary authentication process for the UE in which the authentication success message includes an identifier for the UE and an identifier for the authentication node; and transmitting, by the authentication node, the authentication success message toward the UE.

In at least one instance, the method may further include broadcasting, via the private WWA access network, a fast roaming support indicator. In at least one instance, the fast roaming support indicator may enables the UE to attempt to connect to the private WWA access network using, at least in part, the identifier for the UE and the identifier for the authentication node. In at least one instance, the method may further include obtaining, by a mobility management node associated with the enterprise entity, the identifier for the UE and the identifier for the authentication node; obtaining, by the mobility management node from the authentication node, the authentication material for the UE; and facilitating, by the mobility management node, the connection establishment between the UE and the private WWA access network based, at least in part on the authentication material obtained from the authentication node.

In one form, another computer-implemented method is provided that may include performing, by a UE following a primary authentication process with a mobile network operator domain, a secondary authentication process with an authentication node of an enterprise domain in which the secondary authentication process is performed via a public WWA access network of the mobile network operator domain and the secondary authentication process. In at least one embodiment, the secondary authentication process may include obtaining, by the UE, an identifier for a private WWA access network of the enterprise domain, an identifier for the authentication node, and an identifier for the UE. The method may further include obtaining, by the UE, a broadcast from the private WWA access network of the enterprise domain in which the broadcast indicates support for fast roaming into the private WWA access network. In at least one embodiment, obtaining the broadcast by the UE may trigger the UE to generate ciphering and integrity keys based on the identifier for the private WWA access network. The method may further include communicating, by the UE, a registration request to the enterprise domain via the private WWA access network. In at least one embodiment, the registration request may include, at least in part: an indication that ciphering and integrity keys have already been generated by the UE, the identifier for the authentication node (obtained via the secondary authentication process), and the identifier for the UE (obtained via the secondary authentication process). The method may further include the UE establishing a connection with the enterprise domain via the private WWA access network for one or more data communications with a data network of the enterprise domain.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

As used herein, unless expressly stated to the contrary, use of the phrase 'at least one of', 'one or more of', 'and/or', variations thereof, or the like are open ended expressions that are both conjunctive and disjunctive in operation for any combination of named elements, conditions, or activities. For example, each of the expressions 'at least one of X, Y and Z', 'at least one of X, Y or Z', 'one or more of X, Y and Z', 'one or more of X, Y or Z' and 'A, B and/or C' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z. Additionally, unless expressly stated to the contrary, the terms 'first', 'second', 'third', etc., are intended to distinguish the particular nouns (e.g., element, condition, node, module, activity, operation, etc.) they modify. Unless expressly stated to the contrary, the use of these terms is not intended to indicate any type of order, rank, importance, temporal sequence, or hierarchy of the modified noun. For example, 'first X' and 'second X' are intended to designate two X elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

Communications in a network environment can be referred to herein as 'messages', 'messaging', 'signaling', 'data', 'content', 'objects', 'requests', 'queries', 'responses', 'replies', etc. which may be inclusive of packets. Additionally, messages, requests, responses, replies, queries, etc. are forms of network traffic and, therefore, may comprise one or more packets. As referred to herein and in the claims, the term 'packet' may be used in a generic sense to include packets, frames, segments, datagrams, and/or other generic data units that may be used to transmit communications (e.g., data, commands, etc.) in a network environment. A packet is a formatted unit of data that can contain control or routing information (e.g., source and destination address, source and destination port, etc.) and data, which is also sometimes referred to as a payload or data payload. In some embodiments, control or routing information, management information, or the like can be included in packet fields, such as within header(s) and/or trailer(s) of packets. Internet Protocol (IP) addresses discussed herein and in the claims can include IP version 4 (IPv4) and/or IP version 6 (IPv6) addresses.

The terms 'data', 'information', 'parameters,' and the like as used herein can refer to any type of binary, numeric, voice, video, textual or script data or information or any type of source or object code, or any other suitable data or information in any appropriate format that can be communicated from one point to another via electronic devices and/or networks.

Data or information relating to operations described herein may be stored within any conventional or other data structures (e.g., files, arrays, lists, stacks, queues, records, etc.) and may be stored in any desired storage unit (e.g., database, data or other repositories, queue, etc.). The data or information transmitted between entities may include any desired format and arrangement, and may include any quantity of any types of fields of any size to store the data. The definition and data/information model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

The various functions of the computer systems or other processing systems may be distributed in any manner among any number of software and/or hardware modules or units, processing or computer systems and/or circuitry, where the computer or processing systems may be disposed locally or remotely of each other and communicate via any suitable communications medium (e.g., Local Area Network (LAN), Wide Area Network (WAN), WWAN, wireless LAN (WLAN), Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium, non-transitory computer readable storage medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

A network may be implemented by any number of any type of network (e.g., LAN, WAN, WWAN, WLAN, Internet, Intranet, Virtual Private Network (VPN), Ethernet network, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., LAN, hardwire, wireless link, Intranet, etc.).

A system or computing device may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. A database system may be included within or coupled to a server and/or client systems. The database systems and/or storage structures may be remote from or local to the computer or other processing systems, and may store any desired data.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium, which can be inclusive of non-transitory computer readable storage medium, can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flow chart illustrations and/or block diagrams of methods, apparatus (systems), and computer program products according to the embodiments. It will be understood that each block of the flow chart illustrations and/or block diagrams, and combinations of blocks in the flow chart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flow chart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flow chart and/or block diagram block or blocks.

The flow chart(s) and block diagram(s) in the figures illustrate the architecture, functionality, and operation of possible implementations of systems, methods, and computer program products according to various embodiments. In this regard, each block in the flowchart or block diagrams may represent a module, logic, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flow chart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
through connection of a user equipment (UE) to a public wireless wide area (WWA) access network operated by a mobile network operator, performing, by the UE, a secondary authentication process involving an authentication node of an enterprise network that is to generate authentication material for the UE;
obtaining, by the UE, upon successful completion of the secondary authentication process, an identifier of the authentication node and an identifier of the UE provided by the authentication node;
obtaining, by the UE, a broadcast from a private WWA access network associated with the enterprise network, the broadcast indicating fast roaming support by the private WWA access network;
transmitting a request to register with the enterprise network, wherein the request comprises the identifier of the authentication node and the identifier of the UE provided by the authentication node, wherein the identifier of the authentication node is to enable a mobility management node of the enterprise network to identify the authentication node and the identifier of the UE is to enable the authentication node to identify the authentication material for the UE; and
establishing a connection with the enterprise network via the private WWA access network based on the authentication material.

2. The method of claim 1, wherein the secondary authentication process is an Extensible Authentication Protocol (EAP) authentication process.

3. The method of claim 1, wherein the authentication material is at least one of:
an Access Security Management Entity Key; and
an Access and Mobility Management Function Key.

4. The method of claim 1, wherein the UE obtains the identifier of the authentication node and the identifier of the UE via a session establishment accept message.

5. The method of claim 1, wherein the private WWA access network is at least one of a private cellular access network and a private Citizens Broadband Radio Service (CBRS) access network.

6. The method of claim 1, further comprising:
upon obtaining the broadcast indicating fast roaming support by the private WWA access network, generating, by the UE, ciphering and integrity keys to be used for UE communications.

7. The method of claim 6, wherein the UE communications include at least one of Non-Access Stratum (NAS) communications and Access Stratum (AS) communications.

8. The method of claim 6, wherein the request transmitted by the UE further comprises an indication that the UE has generated the ciphering and integrity keys.

9. One or more non-transitory computer readable storage media encoded with instructions that, when executed by a processor, cause the processor to perform operations, comprising:
through connection of a user equipment (UE) to a public wireless wide area (WWA) access network operated by a mobile network operator, performing, by the UE, a secondary authentication process involving an authentication node of an enterprise network that is to generate authentication material for the UE;
obtaining, by the UE, upon successful completion of the secondary authentication process, an identifier of the authentication node and an identifier of the UE provided by the authentication node;
obtaining, by the UE, a broadcast from a private WWA access network associated with the enterprise network, the broadcast indicating fast roaming support by the private WWA access network;
transmitting a request to register with the enterprise network, wherein the request comprises the identifier of the authentication node and the identifier of the UE provided by the authentication node, wherein the identifier of the authentication node is to enable a mobility management node of the enterprise network to identify the authentication node and the identifier of the UE is to enable the authentication node to identify the authentication material for the UE; and
establishing a connection with the enterprise network via the private WWA access network based on the authentication material.

10. The media of claim 9, wherein the secondary authentication process is an Extensible Authentication Protocol (EAP) authentication process.

11. The media of claim 9, wherein the authentication material is at least one of:
an Access Security Management Entity Key; and
an Access and Mobility Management Function Key.

12. The media of claim 9, wherein the UE obtains the identifier of the authentication node and the identifier of the UE via a session establishment accept message.

13. The media of claim 9, wherein the instructions, when executed by a processor, cause the processor to perform further operations, comprising:
upon obtaining the broadcast indicating fast roaming support by the private WWA access network, generating, by the UE, ciphering and integrity keys to be used for UE communications.

14. The media of claim 13, wherein the request transmitted by the UE further comprises an indication that the UE has generated the ciphering and integrity keys.

15. A wireless device, comprising:
at least one memory element for storing data; and
at least one processor for executing instructions associated with the data, wherein executing the instructions causes the wireless device to perform operations, comprising:
through connection of the wireless device to a public wireless wide area (WWA) access network operated by a mobile network operator, performing a secondary authentication process involving an authentication node of an enterprise network that is to generate authentication material for the wireless device;
obtaining, upon successful completion of the secondary authentication process, an identifier of the authentication node and an identifier of the wireless device provided by the authentication node;
obtaining a broadcast from a private WWA access network associated with the enterprise network, the broadcast indicating fast roaming support by the private WWA access network;
transmitting a request to register with the enterprise network, wherein the request comprises the identifier of the authentication node and the identifier of the wireless device provided by the authentication node, wherein the identifier of the authentication node is to enable a mobility management node of the enterprise network to identify the authentication node and the identifier of the wireless device is to enable the authentication node to identify the authentication material for the wireless device; and establishing a connection with the enterprise network via the private WWA access network based on the authentication material.

16. The wireless device of claim 15, wherein the secondary authentication process is an Extensible Authentication Protocol (EAP) authentication process.

17. The wireless device of claim 15, wherein the authentication material is at least one of:
   an Access Security Management Entity Key; and
   an Access and Mobility Management Function Key.

18. The wireless device of claim 15, wherein the wireless device obtains the identifier of the authentication node and the identifier of the wireless device via a session establishment accept message.

19. The wireless device of claim 15, wherein executing the instructions causes the wireless device to perform further operations, comprising:
   upon obtaining the broadcast indicating fast roaming support by the private WWA access network, generating ciphering and integrity keys to be used for wireless device communications.

20. The wireless device of claim 19, wherein the request transmitted by the wireless device further comprises an indication that the wireless device has generated the ciphering and integrity keys.

* * * * *